(12) United States Patent
Buchmann et al.

(10) Patent No.: US 11,941,005 B2
(45) Date of Patent: Mar. 26, 2024

(54) DATA ARTIFACT INSTANCES FACILIATING FLEXIBLE DATA ACCESS

(71) Applicant: SAP SE, Walldorf (DE)

(72) Inventors: Daniel Buchmann, Kalsruhe (DE); Andreas Balzar, Bad Schoenborn (DE); Matthias Heitmann, Walldorf (DE); Selcuk Imal, Ludwigshafen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/714,002

(22) Filed: Apr. 5, 2022

(65) Prior Publication Data
US 2023/0315734 A1    Oct. 5, 2023

(51) Int. Cl.
G06F 16/28    (2019.01)
G06F 16/2455    (2019.01)

(52) U.S. Cl.
CPC ........ G06F 16/2455 (2019.01); G06F 16/282 (2019.01)

(58) Field of Classification Search
CPC ............................ G06F 16/2455; G06F 16/282
USPC ........................................................ 707/769
See application file for complete search history.

(56) References Cited

U.S. PATENT DOCUMENTS

| | | | |
|---|---|---|---|
| 6,996,567 B2 * | 2/2006 | Ghukasyan | G06F 16/2423 |
| 7,035,860 B2 * | 4/2006 | Poole | G06F 9/451 |
| | | | 707/999.009 |
| 7,149,734 B2 * | 12/2006 | Carlson | G06F 8/36 |
| 7,322,024 B2 * | 1/2008 | Carlson | G06F 8/36 |
| | | | 707/999.103 |
| 7,483,915 B2 * | 1/2009 | Thompson | G06F 16/289 |
| 7,529,811 B2 * | 5/2009 | Thompson | G06F 16/284 |
| | | | 707/999.005 |
| 8,103,695 B2 * | 1/2012 | Warner | G06F 16/86 |
| | | | 707/804 |
| 8,862,543 B2 * | 10/2014 | Pasumarthi | G06F 16/27 |
| | | | 707/637 |
| 8,892,545 B2 * | 11/2014 | Kazmaier | G06F 16/283 |
| | | | 717/136 |
| 9,971,637 B1 * | 5/2018 | Burcham | G06F 16/2455 |
| 10,255,564 B2 * | 4/2019 | Schimmelpfennig | G06Q 10/067 |
| 10,872,001 B1 * | 12/2020 | Burcham | G06F 16/2455 |
| 11,392,361 B2 * | 7/2022 | Kiselev | G06F 8/61 |
| 11,463,544 B1 * | 10/2022 | Peddada | H04L 67/10 |
| 2003/0046282 A1 * | 3/2003 | Carlson | G06F 8/36 |
| 2003/0182470 A1 * | 9/2003 | Carlson | G06F 8/36 |
| | | | 719/328 |
| 2004/0220912 A1 * | 11/2004 | Manikutty | G06F 16/30 |
| | | | 707/E17.127 |

(Continued)

Primary Examiner — Hanh B Thai
(74) Attorney, Agent, or Firm — Klarquist Sparkman, LLP

(57) ABSTRACT

Techniques and solutions are described for providing flexible access to data during execution of a data access request. Multiple instances of a data artifact are created, where different instances of the data artifact provide access to different data sources having data associated with the data access request. When a data access request is executed, a particular data artifact instance can be used during execution of the data access request. In some cases, switching logic can be used to determine which data artifact instance is to be used in executing the data access request. Also described are technologies for facilitating creation of data artifact instances corresponding to a modelling artifact.

20 Claims, 19 Drawing Sheets

(56) References Cited

U.S. PATENT DOCUMENTS

| | | | |
|---|---|---|---|
| 2005/0114147 A1* | 5/2005 | Kumaran | G06Q 10/10 705/1.1 |
| 2006/0004844 A1* | 1/2006 | Rothschiller | G06F 40/143 707/999.102 |
| 2006/0195476 A1* | 8/2006 | Nori | G06F 16/258 |
| 2007/0219976 A1* | 9/2007 | Muralidhar | G06F 16/84 |
| 2007/0260571 A1* | 11/2007 | Mansfield | G06F 40/154 706/48 |
| 2008/0133558 A1* | 6/2008 | Carlson | G06F 8/36 |
| 2009/0024652 A1* | 1/2009 | Thompson | G06F 16/252 707/999.102 |
| 2009/0112916 A1* | 4/2009 | Stuhec | G06Q 10/10 707/999.102 |
| 2009/0187587 A1* | 7/2009 | Chatterjee | G06F 16/22 707/999.102 |
| 2009/0254877 A1* | 10/2009 | Kuriakose | G06F 8/36 707/999.1 |
| 2010/0077380 A1* | 3/2010 | Baker | G06F 8/71 717/120 |
| 2010/0161645 A1* | 6/2010 | Chatterjee | G06Q 10/10 707/769 |
| 2010/0332473 A1* | 12/2010 | Brodsky | G06F 11/3636 707/736 |
| 2011/0173220 A1* | 7/2011 | Jung | G06Q 10/06 707/769 |
| 2012/0317075 A1* | 12/2012 | Pasumarthi | G06F 16/27 707/626 |
| 2013/0006968 A1* | 1/2013 | Gusmini | G06F 16/25 707/E17.014 |
| 2013/0218911 A1* | 8/2013 | Li | G06F 16/21 707/E17.069 |
| 2013/0246995 A1* | 9/2013 | Ferrao | G06F 21/54 717/104 |
| 2014/0025698 A1* | 1/2014 | Gharib | G06F 40/258 707/758 |
| 2014/0279839 A1* | 9/2014 | Balzar | G06F 16/20 707/607 |
| 2015/0052450 A1* | 2/2015 | Goldberg | H04L 51/42 715/752 |
| 2015/0074819 A1* | 3/2015 | Borenstein | G06F 16/213 707/706 |
| 2016/0078064 A1* | 3/2016 | Sassin | G06F 16/211 707/606 |
| 2016/0124645 A1* | 5/2016 | Denise | G06F 11/3037 711/170 |
| 2016/0124646 A1* | 5/2016 | Hunt | G06F 3/0673 711/170 |
| 2016/0179884 A1* | 6/2016 | Jerzak | G06F 16/2455 707/718 |
| 2017/0286456 A1* | 10/2017 | Wenzel | G16H 10/20 |
| 2018/0083944 A1* | 3/2018 | Vats | H04L 63/0815 |
| 2018/0341631 A1* | 11/2018 | Verma | G06F 40/30 |
| 2020/0012930 A1* | 1/2020 | Kumar | G06F 16/3344 |
| 2020/0394036 A1* | 12/2020 | Morneau | G06F 16/116 |
| 2021/0056100 A1* | 2/2021 | Steinhauser | G06F 8/36 |
| 2023/0196803 A1* | 6/2023 | Roessler | G06V 10/771 382/181 |

* cited by examiner

```
{
  „definitions": {                              500
    „kind": „entity",
    „elements": {          504
     ┌─SalesOrder: {
     │   „key": true,
508  │   „type": „cds.String",
     │   „length": 10    ↖510                    508
     },
     SalesOrderType: {
        „type": „cds.String",
        „length": 1
     },                    ┌─510
     ┌─SalesOrganization: {
508  │  „type": „cds.String",
     │  „length": 4        504
     },
     DistributionChannel: {
        „type": „cds.String",
        „length": 2
     }
    },
    „query": {                                   528
      "SELECT": {     ┌─524
        "from": {
           "ref": [ "I_SalesDocument]
        },                                       520
        "columns": [
          {
             "ref": [ "SalesDocument" ]
          },       ↖528
          {
             "ref": [ "SalesDocumentType" ]
          },
          {
             "ref": [ "SalesOrganization" ]
          },       ↖528
          {
             "ref": [ "DistributionChannel" ]
          }
        ]
      }
    }
  }
}
```

FIG. 5

```
                                  ┌─710
   CREATE VIEW I_SalesDocument
     ( IN P_Switch cds.String(5) )
     AS SELECT
      ┌─CASE WHEN P_Switch = 'REMOTE'
      │    REMOTE.SalesOrder
 720  │  ELSE                    ─724
      │    V.SalesOrder
         END AS SalesOrder,
         CASE WHEN P_Switch = 'REMOTE'                       700
           REMOTE.SalesOrderType
         ELSE
 720     V.SalesOrderType
      └─END AS SalesOrderType,
       ─CASE WHEN P_Switch = 'REMOTE'
           REMOTE.SalesOrganization─┐
         ELSE
        ┌─ V.SalesOrganization    724
        │  END AS SalesOrganization,
 728     CASE WHEN P_Switch = 'REMOTE'
           REMOTE.DistributionChannel
         ELSE
        ┌─V.DistributionChannel
        │  END AS DistributionChannel
 728  FROM
         I_SalesOrder_V( P_Switch ) AS V
         FULL OUTER JOIN I_SalesOrder_REMOTE AS REMOTE
           ON 1 = 2
                                      ─724
```

FIG. 7

```
                                                    800
CREATE VIEW I_SalesOrder_V                         ⤸
  ( IN P_Switch cds.String(5) )
  AS SELECT
810   SalesDocument AS SalesOrder,
⤵     SalesDocumentType AS SalesOrderType,
      SalesOrganization,
      DistributionChannel
  FROM
    I_SalesDocument_V( P_Switch )
                    ⤷524

850
CREATE REMOTE TABLE I_SalesOrderHeader_REMOTE (          ⤸
  SalesOrder cds.String(10),
  SalesOrderType cds.String(1),
  SalesOrganization cds.String(4),
  DistributionChannel cds.String(2)
)
```

FIG. 8

```
CREATE VIEW I_SalesDocument_V
  ( IN P_Switch cds.String(5) )
  AS SELECT
    SalesDocument,
    SalesDocumentType,
    SalesOrganization,
    DistributionChannel
  FROM
    I_SalesDocument_REMOTE
```

FIG. 10

```
CREATE REMOTE TABLE I_SalesDocument_REMOTE (
  SalesDocument cds.String(10),
  SalesDocumentType cds.String(1),
  SalesOrganization cds.String(4),
  DistributionChannel cds.String(2)
)
```

FIG. 11

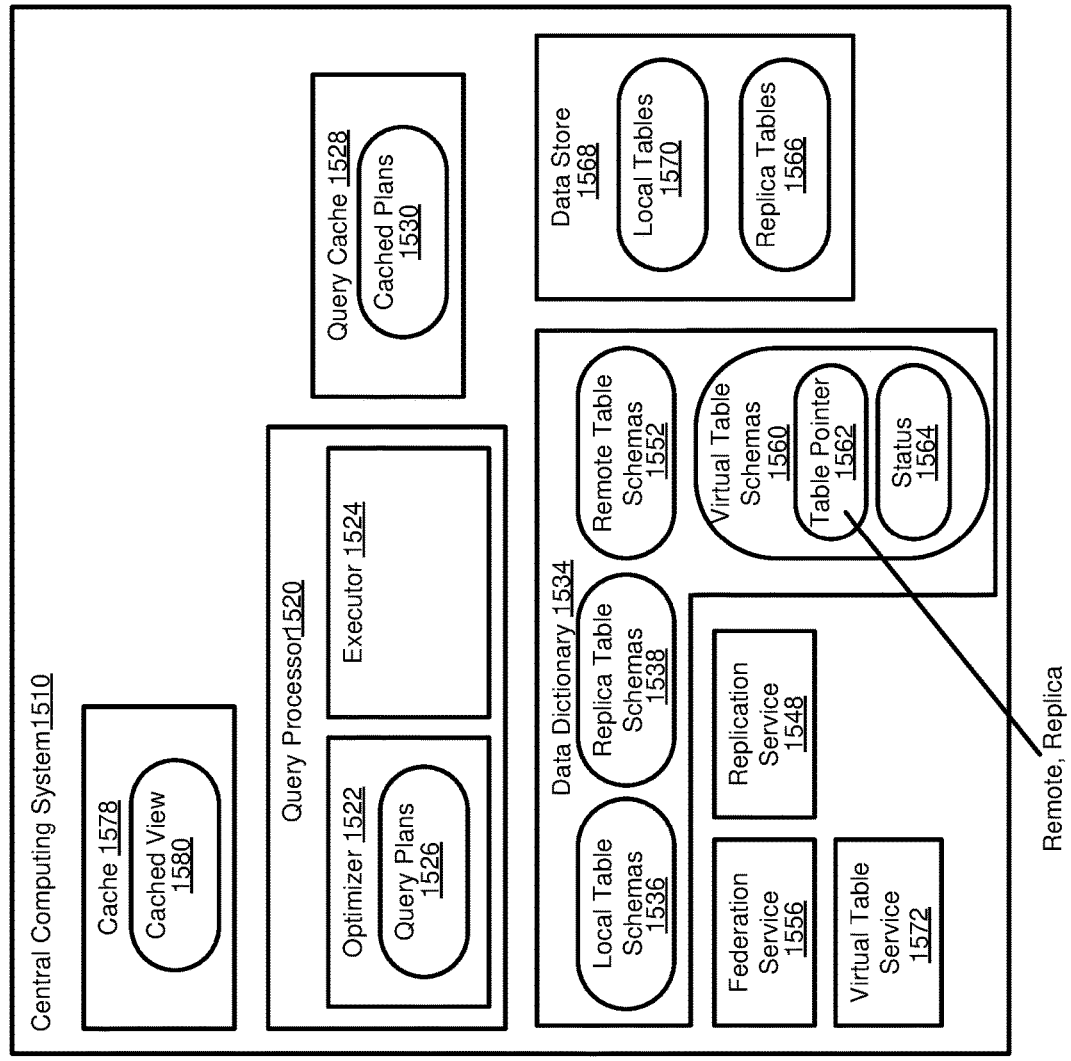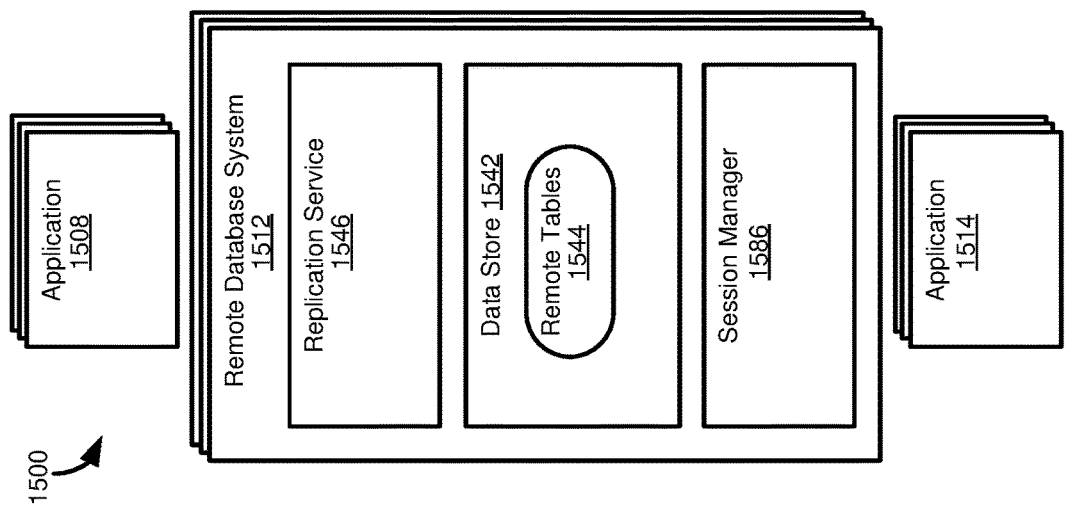
FIG. 15

| Column Name | Data Type | Unit | Description |
|---|---|---|---|
| TABLE_TYPES | VARCHAR(32) | | One or more of ROW, COLUMN, VIRTUAL |
| HAS_REPLICA | VARCHAR(5) | | TRUE, if virtual table has replica, else FALSE |
| SOURCE_SCHEMA_NAME | NVARCHAR(256) | | Schema name that includes virtual table |
| SOURCE_TABLE_NAME | NVARCHAR(256) | | Virtual table name |
| REPLICA_SCHEMA_NAME | NVARCHAR(256) | | Schema name that includes replica table |
| REPLICA_TABLE_NAME | NVARCHAR(256) | | Replica table name |
| REPLICA_TYPE | VARCHAR(12) | | Replication type – ASYNCHRONOUS, SYNCHRONOUS |
| IS_ENABLED | VARCHAR(5) | | TRUE if replication enabled, FALSE otherwise |
| IS_SHARED | VARCHAR(5) | | TRUE if replica table can be shared by multiple virtual tables, else FALE |
| LOAD_UNIT | NVARCHAR(8) | | Load UNIT of replica table by toggle DDL. Can be different than load unit of replica table for SHARED mode (PAGE, COLUMN) |

FIG. 16A

| | | | |
|---|---|---|---|
| 1662 HOST | VARCHAR(64) | | Host name |
| 1664 PORT | INTEGER | | Internal port |
| 1666 SCHEMA_NAME | NVARCHAR(256) | | Schema name that includes replica table |
| 1668 TABLE_NAME | NVARCHAR(256) | | Replica table name |
| 1670 REPLICA_TYPE | VARCHAR(12) | | Replication type (ASYNCHRONOUS, SYNCHROUNOUS) |
| 1672 SOURCE_SCHEMA_NAME | NVARCHAR(256) | | Schema name that includes virtual table |
| 1674 SOURCE_TABLE_NAME | NVARCHAR(256) | | Virtual table name |
| 1676 PART_ID | INTEGER | | Partition ID (0 for non partition, partition 1 through n if partitioned) |
| 1678 REPLICATION_ENABLING_PROCESS | DOUBLE | Percent | Progress of generating replica table |
| 1680 REPLICATION_STATUS | NVARCHAR(8) | | Status of replication of replica table (DISABLED, ENBLING, ENABLED) |
| 1682 LAST_ENABLE_TIME | TIMESTAMP | | Last replication enabling time |
| 1684 LAST_DISABLE_TIME | TIMESTAMP | | Last replication disabling time |
| 1686 SHARE_COUNT | INTEGER | Counter | Number of virtual tables pointing to shared replica table – all users |

CREATE VIRTUAL TABLE
1. Create virtual table with replica: CREATE VIRTUAL TABLE <table_name> AT <remote_location_clause> <remote_property_clause> [NOT] SHARED REPLICA [<replica_partition>] [<load_unit>] AT <replica_location>  ⌒1708

ALTER VIRTUAL TABLE  ⌒1712
1716 1. Add replica: ALTER VIRTUAL TABLE <table_name> ADD [NOT] SHARED REPLICA [ <replica_partition>] [ <load_unit>] AT< replica_location>  ⌒1720
⌒2. Drop replica: ALTER VIRTUAL TABLE<table_name> DROP REPLICA{ATALLLOCATIONS I AT <replica_location}
   3. Enable replica: ALTER VIRTUAL TABLE <table_name> ENABLE REPLICA {AT ALL LOCATIONS I AT <replica_location>}
⌒4. Disable replica: ALTER VIRTUAL TABLE <table_name> DISABLE REPLICA{ATALLLOCATIONS I AT <replica_location>}
1722 5. Move replica: ALTER VIRTUAL TABLE <table_name> MOVE REPLICA FROM [LOCATION] <from_location> TO [LOCATION] <to_location>
   6. Alter replica: ALTER VIRTUAL TABLE <table_name>ALTER REPLICA [<replica_partition>] [<load_unit>] AT<replica_location>  ⌒1726
   1730⌒

FIG. 17

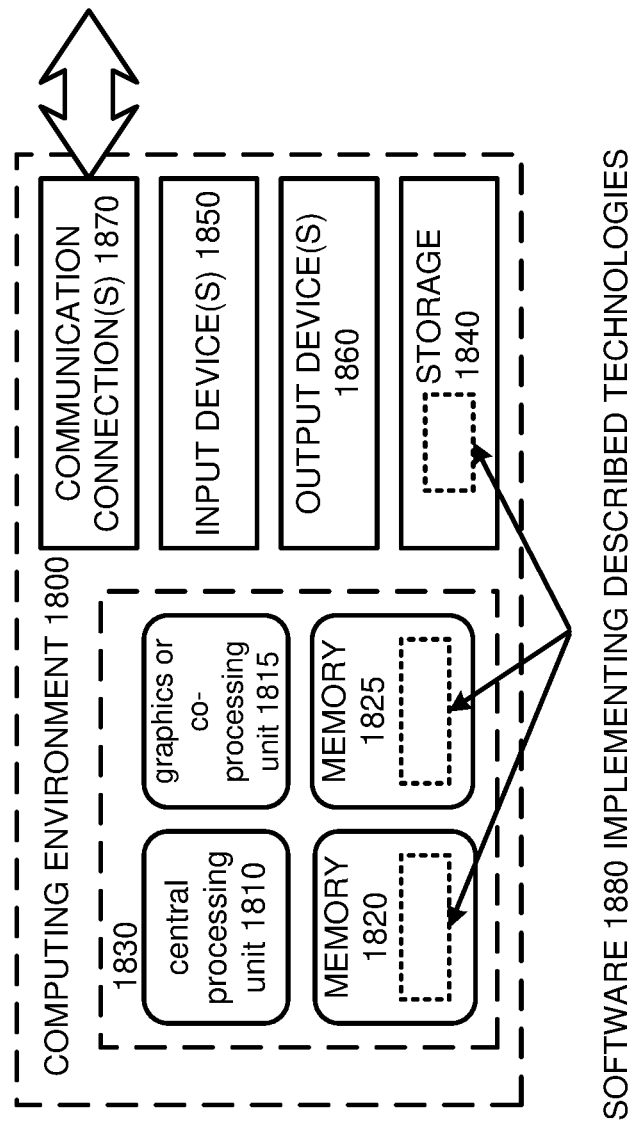

DATA ARTIFACT INSTANCES FACILITATING FLEXIBLE DATA ACCESS

FIELD

The present disclosure generally relates to data access requests and data artifacts useable to process data access requests. Particular implementations provide multiple instances of a data artifact, where different instances are useable to access data associated with different data sources.

BACKGROUND

It is increasingly common for enterprises to have data stored in a variety of systems, including in one or more local systems and in one or more cloud systems. The systems can be of different types—such as storing data in different formats (e.g., a relational database versus a database that stores JAVA documents) or storing data using different database management systems (e.g., using software and/or hardware provided by different vendors). Even where data is stored in the same format and using software of the same vendors, differences can exist in what data is stored at a particular location and the schema used to store it.

In order to help address these issues, federated databases have been created. As opposed to a distributed database, which is a single database management system that involves multiple computer nodes (e.g., a coordinator node and one or more worker nodes), a federated database includes functionality to make data from multiple, distinct database management systems (or other data sources or data stores) available through a common platform or interface.

Even for data stored in a primary (non-federated) data store, data can be stored in different manners. For example, data can be replicated from another data source (including a data source that is, or could serve as, a federated data source) and stored in the primary data store. For other data, the primary data store may serve as the main repository for the data, where the data can optionally be made available to other data stores via replication or federation.

Typically, when a data model or a data query are created, particular data components (such as a field of a database table) are associated with a particular data source, and data model artifacts and data queries can be created in a manner appropriate for the relevant data source or sources. However, complications can arise when it is not clear how data access/data sources should be structured, such as when a data model is imported. In addition, typical data models are static in how they reference associated data. This can limit flexibility, such as when different circumstances would benefit from having different options for accessing data. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for providing flexible access to data during execution of a data access request. Multiple instances of a data artifact are created, where different instances of the data artifact provide access to different data sources having data associated with the data access request. When a data access request is executed, a particular data artifact instance can be used during execution of the data access request. In some cases, switching logic can be used to determine which data artifact instance is to be used in executing the data access request. Also described are technologies for facilitating creation of data artifact instances corresponding to a modelling artifact.

In one aspect, a method is provided that can be used to process a data access request, where a selection is made between two or more instances of a data artifact to be used in executing the data access request. A first data access request is received. The first data access request specifies at least a first data artifact in a hierarchy that includes a plurality of data artifacts distributed among a plurality of levels of the hierarchy. At least a portion of the plurality of data artifacts have a plurality of different instances. Different instances of a data artifact specify data associated with the data artifact at different storage locations.

A first level of the hierarchy includes at least a first data artifact of the plurality of data artifacts that includes at least a first instance and at least a second instance. It is determined that the at least a first instance of the at least a first data artifact is to be used in processing the first data access request.

The first data access request is processed. The processing includes retrieving first data from at least the first instance of the at least a first data artifact, or at a location specified by the at least a first instance of the at least a first data artifact. At least a portion of the first data, or second data produced or derived at least in part from the at least a portion of the first data, is returned in response to the data access request.

In a further aspect, a method is provided for instantiating multiple data artifact instances corresponding to a modelling artifact. A modelling schema is received that includes a plurality of modelling artifacts distributed among a plurality of levels of a hierarchy. It is determined that a plurality of instances of a first data artifact corresponding to a first modelling artifact of the plurality of modelling artifacts are to be created. A first instance of the first data artifact is instantiated. The first instance of the first data artifact is instantiated at a first level of a hierarchy of a data artifact schema that includes data artifacts corresponding to at least a portion of the plurality of modelling artifacts. The first instance of the first data artifact includes first data, or indicates a source of first data corresponding to the first data artifact.

A second instance of the first data artifact is instantiated at the first level of the hierarchy. The second instance of the first data artifact includes second data or indicates a source of second data corresponding to the first data artifact. The second data includes all or a portion of the first data or is different in whole or part from the first data.

In a yet further aspect, a method is provided for creating multiple instances of a data artifact. Instructions are received to create a first instance of a first data artifact in a hierarchical schema that includes a plurality of data artifacts distributed among a plurality of levels of a hierarchy of the hierarchical schema. A first instance of the first data artifact is created at a first level of the plurality of levels of the hierarchy. The first instance of the first data artifact includes, or points to, first data.

Instructions to create a second instance of the first data artifact are received. The second instance of the first data artifact is created at the first level of the hierarchy. The second instance of the first data artifact includes, or points to, second data. The second data includes all or a portion of the first data or is different in whole or part from the first data.

Instructions are received to create at least a first instance of a second data artifact in the hierarchical schema at a second level of the hierarchy. The first instance of the first data artifact points to the at least a first instance of the second data artifact and the second level of the hierarchy is lower than the first level of the hierarchy. The at least a first instance of the second data artifact is created.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 5 presents example code for a higher-level modelling artifact that builds on a base modelling artifact.

FIG. 7 presents example code for switching logic that can be used to switch between data artifact instances corresponding to the higher-level modelling artifact of FIG. 5.

FIG. 8 presents example code for data artifact instances referenced by the switching logic of FIG. 7.

FIGS. 10 and 11 present example code for data artifacts referenced by the switching logic of FIG. 9.

FIG. 15 is a diagram illustrating a computing architecture having virtual table schemas with logical pointers that can target remote tables or replica tables.

FIGS. 16A and 16B provide example column definitions that can be used with database artifacts useable in managing virtual table schemas or replica tables used with virtual table schemas.

FIG. 17 provides example query language statements for performing actions related to virtual table schemas.

FIG. 18 is a diagram of an example computing system in which some described embodiments can be implemented.

DETAILED DESCRIPTION

Example 1— Overview

Figure 1:
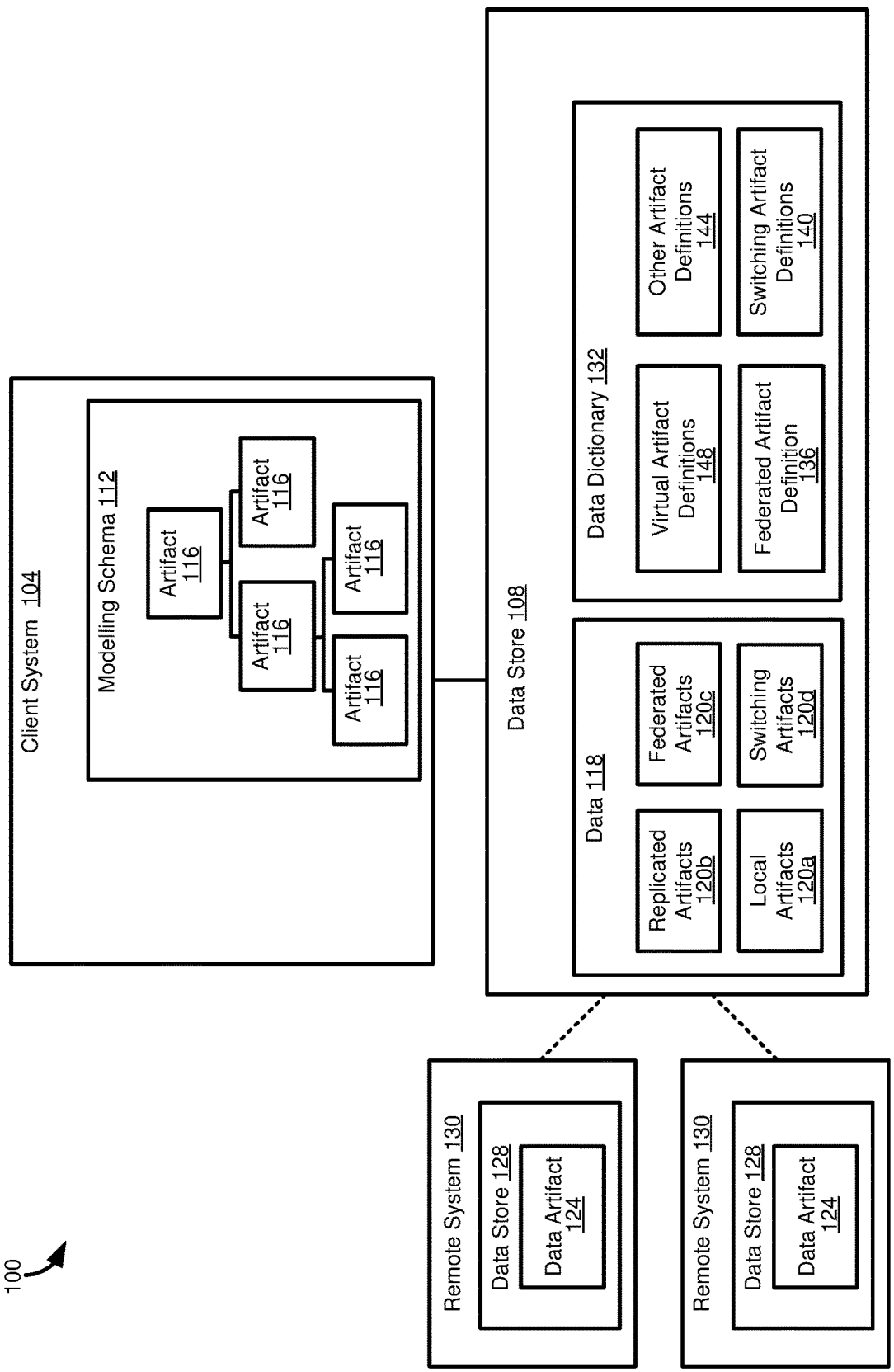
FIG. 1 is a diagram illustrating a computing architecture having a hierarchical modelling schema and data artifacts corresponding to artifacts in the modelling schema.

It is increasingly common for enterprises to have data stored in a variety of systems, including in one or more local systems and in one or more cloud systems. The systems can be of different types—such as storing data in different formats (e.g., a relational database versus a database that stores JAVA documents) or storing data using different database management systems (e.g., using software and/or hardware provided by different vendors). Even where data is stored in the same format and using software of the same vendors, differences can exist in what data is stored at a particular location and the schema used to store it.

In order to help address these issues, federated databases have been created. As opposed to a distributed database, which is a single database management system that involves multiple computer nodes (e.g., a coordinator node and one or more worker nodes), a federated database includes functionality to make data from multiple, distinct database management systems (or other data sources or data stores) available through a common platform or interface.

Even for data stored in a primary (non-federated) data store, data can be stored in different manners. For example, data can be replicated from another data source (including a data source that is, or could serve as, a federated data source) and stored in the primary data store. For other data, the primary data store may serve as the main repository for the data, where the data can optionally be made available to other data stores via replication or federation.

Typically, when a data model or a data query are created, particular data components (such as a field of a database table) are associated with a particular data source, and data model artifacts and data queries can be created in a manner appropriate for the relevant data source or sources. However, complications can arise when it is not clear how data access/data sources should be structured, such as when a data model is imported. In addition, typical data models are static in how they reference associated data. This can limit flexibility, such as when different circumstances would benefit from having different options for accessing data. Accordingly, room for improvement exists.

As mentioned above, in some cases, when a schema is defined, data artifacts, such as tables or views, can be specified as remote (federated), replicated to the primary data source, or native to the primary data source. In some cases where a data model is imported, connections between data artifacts may not exist or may not be useable, and so individual data artifacts may be set to access remote counterparts.

If relationships between data artifacts are maintained when a schema is imported, opportunities arise to structure the schema to achieve various goals, such as based on considerations such as data transfer volume, data access speed, data latency (e.g., whether it may be acceptable to use data that is at least somewhat stale—such as a local copy of the data being out of date with respect to a primary copy of the data on a remote system), and data access or authorization considerations (e.g., whether a particular user has access to particular data artifacts). In addition, it can be beneficial to allow different access paths to data based on different use scenarios. In one scenario, it might be acceptable to use stale data in order to obtain a faster response time, while in another scenario it may be unacceptable to use stale data, and processing delays may be tolerated.

The present disclosure provides techniques that can be used to allow a schema to be constructed where different artifacts in a schema are able to access data using different methods, and where the access methods can be created according to various rules. The present disclosure also provides techniques where a schema allows the same basic data artifact to be accessed in different ways, such as a schema allowing access to a data artifact via data federation, if recent data is needed, or access to a local copy (e.g., replicated data), if recent data is not needed.

The present disclosure provides techniques that allow data associated with a data artifact in a hierarchy to access data in multiple ways, where the data artifact may be expressed as two instances. In a particular example, the access can be switched from accessing a "view" instance of the data artifact that accesses data from a data artifact at a lower level of the hierarchy, where the data artifact at the lower level can itself have multiple access options, to an instance of the data artifact that provides direct access to data associated with that data artifact (or, at least the access does not go through a lower level of the hierarchy). That is, at least two instances of the data artifact exist, one that refers to data in a lower level of the hierarchy and another that refers to data directly associated with that data artifact, such as data available via replication (locally) or federation (accessing a remote data source, such as a remote table or view, which can be a view calculated on the fly or a materialized view).

In some cases, the data artifact that provides direct access to data can itself provide flexible data access, such as having a logical pointer having a value that indicates a particular data source, and where the value of the logical pointer can be updated dynamically to indicate a different data source. As an example, the logical pointer can be updated to point between data sources that are federated, available locally via replication, available locally natively, are associated with a cache, between different storage types (e.g., where data is dynamically adjusted between being stored in physical memory or persistent storage, such as disk), or pointing to different types of remote storage, such as pointing to data in a data lake or data in cloud storage.

In a particular implementation, switching between data artifact instances can be accomplished using a switch view. The switch view can have conditional statements, where the conditions define which of the multiple available data artifacts are used for a given data request (e.g., a query). For instance, a query, such as in SQL, can reference the switch view. Elements in the query (e.g., operations specified in the query, data sources specified in the query, parameters specified in the query, such as values used to filter data, or combinations therefore) or semantic flags in the query (e.g., "using data artifact X," "with federation," "using local," "time sensitive," "use recent data") can be used to determine which of the multiple instances of the data artifact should be used for processing the query.

Data artifacts further down the hierarchy can themselves have multiple access methods, and can have a mechanism for determining which access method should be used for a particular request. In some cases, an access method used for higher-level data artifacts can be propagated down to lower-level artifacts. Or, parameters usable to determine which access method should be used can be propagated down to be used in determining how lower-level data artifacts will be accessed, where the selected access technique is independent of that of what is selected for the higher-level data artifact (instance of a data artifact). As the switching criteria can include conditional statements, the conditional statements can include a default access method if no information in a request dictates switching away from the default access technique. Default access techniques can be independently selected for different data artifacts in a hierarchy where switching is an option.

In another implementation, multiple instances of a data artifact can exist for one or more data artifacts in a hierarchy, but access is not determined for a particular request based on a switching view, or similar construct. In some cases, the request itself can specify the appropriate data artifact instance for a particular access method desired (e.g., the data artifact instances can have identifiers that differ such as a user can select data artifact instance A or A', which are instances of the same data artifact whose data is accessed using different techniques). Or, other types of switching logic can be included in request processing logic. For instance, logic can specify that lower-level artifacts should be used unless a particular access method is available for a given data artifact.

In a yet further example, multiple queries (or requests, more generally) can be defined, where each query provides a different combination of access techniques for data artifacts in the query. Thus, a user or process need simply select the appropriate query for execution without needing to construct the query or have detailed knowledge of the relevant schema. Selection can be indirect, such as selecting user interface elements providing criteria that are tied to flags indicating what type of query should be selected. In particular, a user interface screen can provide a user with options to define a query (e.g., selecting particular fields of interest and selection criteria) and to indicate, for example, whether data recency or query speed is more important, and then software logic can construct or select the appropriate query.

Disclosed technologies can also facilitate implementing the disclosed flexible access techniques. For instance, given a particular schema as an input, a software process can create appropriate data artifact instances for an artifact of the input schema. For instance an artifact in a schema (a model or design time data artifact) can be used to instantiate a runtime data artifact referencing a lower-level artifact, a runtime data artifact providing access to data via replication or federation, and optionally switching logic or data artifacts (e.g., switching views). Default switching logic can also be provided.

A user or process may choose to enable the disclosed flexible access techniques, such as by including a suitable annotation in a model data artifact which triggers code to create the runtime data artifact instances as described above.

When source data is not located at the primary data source (in which the schema/data artifact hierarchy is being implemented), a data artifact can be created to access data from a remote data source, such as via federation or by creating by replicating data (thus, essentially creating a local copy of the data, even if the data source is not the primary data source of the data).

Example 2— Example Architecture for Implementing Data Artifact Schemas Having Multiple Data Artifact Instances FIG. 1 illustrates a computing environment 100 in which disclosed technologies can be implemented. The computing environment 100 includes a client system 104 that is in communication with a data store 108. The data store 108, in particular examples, is a relational database system. The client system 104 can be a system that is used by an end-user, or can represent a computing platform, framework, or middleware that is in turn accessed by another end user system (not shown).

The client system 104 includes a modelling schema 112. The modelling schema 112 can be, in some cases, a virtual data model. In other cases, the modelling schema 112 can be a design time construct that is used to create corresponding runtime artifacts, which can include creating artifacts in a virtual data model or in the data store 108. When a virtual data model is used, artifacts in the virtual data model can reference corresponding artifacts in the data store 108.

The modelling schema 112 can include, as shown, a number of hierarchically arranged artifacts 116 (for instance, modelling artifacts). The artifacts 116 can build upon one another, such as having a higher-level artifact selecting data from lower-level artifacts, and optionally supplementing or altering aspects of the lower-level artifacts. Although a relatively simple hierarchy of artifacts 116 is shown in FIG. 1, a modelling schema 112 can contain multiple hierarchies, and the hierarchies can be significantly more complex than shown in FIG. 1. In addition, a modelling schema 112 can have artifacts 116 that are not hierarchically arranged.

The data store 108 can include data 118, such as data stored in various data artifacts 120 (shown as 120a-120d), such as tables or views in a relational database system (serving as the data store). In other cases, the data artifacts do not directly store the data, but provide access to data. For example, the data artifacts can be objects in a virtual data model that are mapped to data in data sources such as tables or views in a relational database system (or other sources of structured, semi-structured, or unstructured data). In other cases, the data artifacts can be physical tables or views, or similar constructs in other sources of structures, semi-structured, or unstructured data.

The data artifacts 120 can be of different types, where a type can indicate how a data artifact accesses or obtains data, or how a data artifact is used. Data can be stored in local data artifacts 120a. A local data artifact 120a can be an artifact for which data is stored in the data store 108, and the data store is the primary source of the data for the local data artifact 120a. That is, the data from the local data artifact 120a can be replicated to other data stores, but the data store 108 determines a final instance of the data stored in the local data artifact.

Data artifact 120b represents a replicated (or replica) data artifact. A replicated data artifact 120b contains data that is stored in the data store 108, but another instance of the relevant data artifact (e.g., one stored on another data store) determines a final instance the data for the replicated data artifact, and sends, or causes to be sent, the relevant data to the data store 108 to be stored in the replicated data artifact (which is typically the most up to date source of its data).

A federated data artifact 120c is similar to the replica data artifact 120b, but the data is not permanently stored in the data store. Although, replicated data can be subject to deletion or modification, (such as by a source data artifact, from which data is replicated to the data store 108, or through deletion of the replica data artifact) stored in the data store 108. That is, federated data can be obtained from a data artifact 124 in a data store 128 of a remote system 130 and used for a particular purpose (e.g., a query) and deleted after the query has been executed or the data is otherwise no longer needed or actively being used. In some cases, data obtained by federation can be stored in a cache, but the data can be removed from the cache according to a cache management policy, without corresponding deletion of the data at the data artifact 124.

Although shown as being part of the data 118, in some cases a federated data artifact 120c exists in a data dictionary 132 (or information schema or similar structure) of the data store 108, but data for the federated data artifact is not stored as part of the data 118.

The data store 108 is also shown as including switching artifacts 120d. A switching artifact 120d, at least in some implementations, also does not store data. Rather, a switching artifact 120d is used to switch between artifacts 120 in the data store 108, whether the artifacts or part of the data 118 or are definitions that are part of the data dictionary 132. Consistently, like the federated data artifacts 120c, in some cases switching artifacts are defined in the data dictionary 132 (i.e., switching artifact definition 140), but a switching artifact 120d is not included in the data 118.

The data dictionary 132 is shown as including a federated data artifact definition 136. For instance, data obtained by federation can be provided to a requesting process (e.g., a query) without being stored in the data 118, although the data can be stored in association with the data store 108, generally, such as being stored in memory or in persistent storage associated with the data store, including in a cache, as described above.

The data dictionary 132 can include definitions 144 of other data artifacts 120, including data artifacts which do typically exist as part of the data 118. For example, the definitions can be for local artifacts 120a, such as database tables or database views.

One other type of data artifact definition (and optionally data artifacts, not shown, in the data 118) in the data dictionary 132 is a virtual artifact definition 148. A virtual artifact definition 148 can include a definition of a structure of a data artifact (whether local or remote) and can indicate where the data is located, such as with a logical pointer. The value of the logical pointer can be updated, such as dynamically, to point to different data artifacts, including at different locations, holding data that should be used when the data artifact is used, such as in a query. For example, a logical pointer can be updated to point to a replicated data artifact 120b or a federated data artifact 120c (or point directly to the data artifact 124 of the remote system 130). The logical pointer can point to other data artifacts, data artifact definitions, or other places where data associated with a data artifact definition may be stored, including data stored in a data lake, a cache, or a stored where data can be dynamically moved between storage types (e.g., a memory buffer or disk-based storage).

Example 3— Example Data Artifact Schema Having Switching Logic

Figure 2:
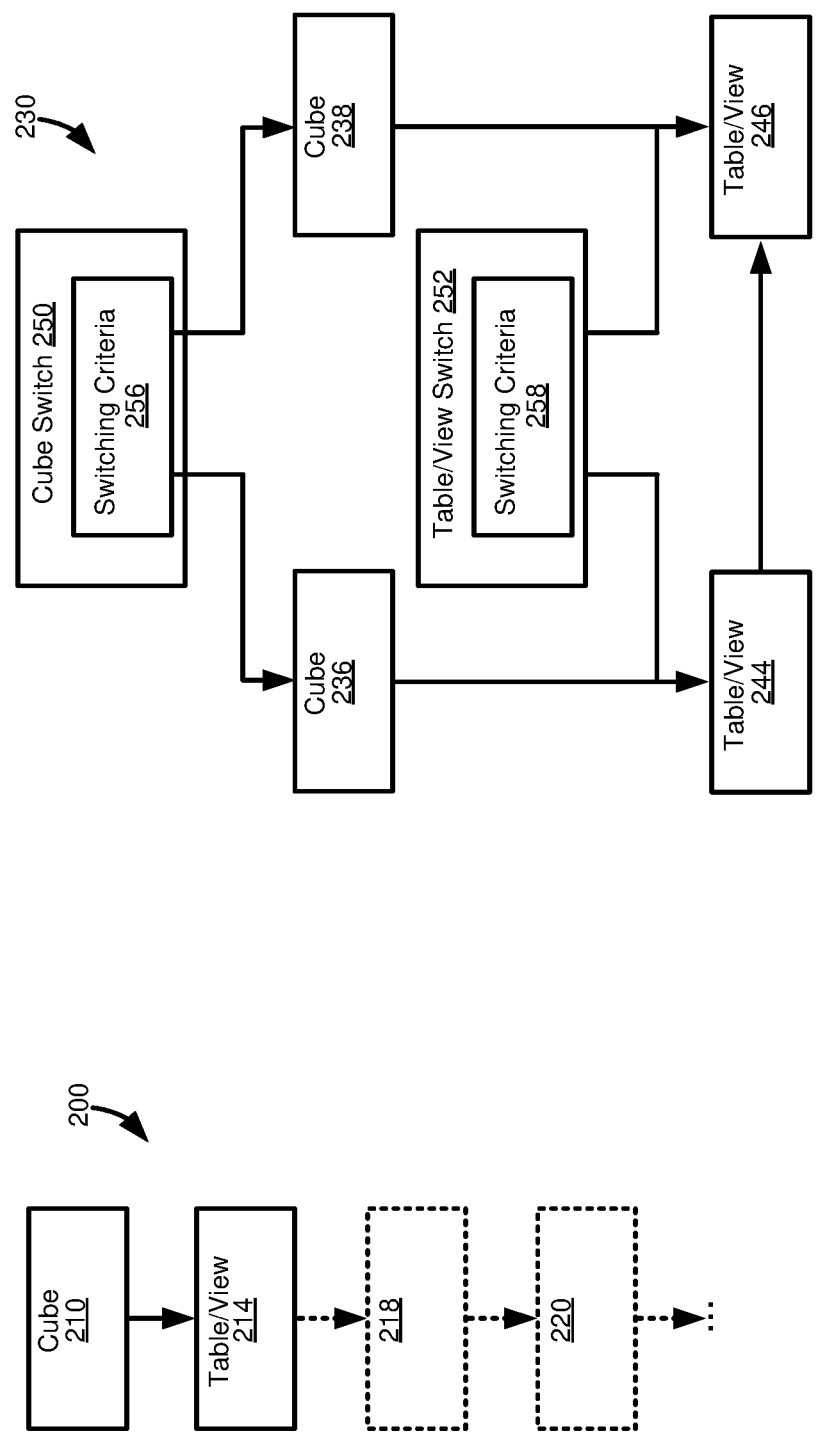
FIG. 2 is a diagram illustrating how multiple instances of a data artifact corresponding to a modelling artifact can be used with switching logic in executing data access requests.

FIG. 2 illustrates a scenario where dynamic access to data artifacts corresponding to modelling artifacts in a data model 200 can be implemented in a way that provides dynamic, variable access to data. The data model 200 is illustrated with two modelling artifacts, a modelling object 210 representing a cube (e.g., an OLAP cube) that references a modelling artifact 214 representing a lower-level source of data, such as a table or view. That is, the data model 200 is organized hierarchically, where higher-level artifact, like the cube artifact 210, build on lower-level objects like the modeling artifact 214. In this particular example, the cube modelling artifact 210 may select dimensions or facts associated with the modelling artifact 214.

The data model 200 is illustrated with only two modelling artifacts 210, 214 to present relevant technological concepts. In practice, hierarchies are typically deeper (as illustrated by the dashed artifact boxes 218, 220) and wider than the data model 200. For example, in practice, a cube modelling object may build on multiple views, which in turn are derived at least in part from lower-level views or tables. The techniques described for the simple data model 200 can be implemented in a similar manner in far more complex data models.

The data model 200 can be translated into a schema 230 of runtime data artifacts (where at least some of the data artifacts are instantiated as two, or more, different instances, which together are referred to collectively as a "data artifact" for ease of presentation, as each instance corresponds to a common artifact, which just the source of data differing between the instances). The runtime data artifacts can represent data artifacts in a virtual data model or in a physical data model associated with one or more data sources. For instance, the data artifacts can represent virtual data artifacts that are mapped to (i) physical data artifacts, (ii) physical data artifacts, (iii) or a combination of (i) and (ii). Examples of physical data artifacts includes database tables and database views. Examples of virtual data artifacts include definitions of virtual tables, virtual views, or artifacts or data that modify how the virtual tables or views store data or are processed. Views can include views that provide a definition of an OLAP cube, such as view on a star or snowflake schema of a database, or a view on top of another view that is defined with respect to a star or snowflake schema.

The schema 230 includes a first set of data artifacts 236, 238 that are runtime artifacts that correspond to the cube modelling artifact 210 and the modelling artifact 214, respectively. The data artifacts 236, 238 are associated with a first type of data source. For instance, the data artifacts 236, 238 may refer to a remote, but not necessarily federated, data source. In a particular example, the data artifacts 236, 238 are defined in SAP HANA Cloud (available from SAP SE, of Walldorf, Germany), but the underlying data is stored at an on-premise installation of SAP HANA. Thus, a query using one or both of the data artifacts 236, 238 is sent to the on-premise database, and responsive data (which can be the entire contents of a data artifact, such as a table, but is typically limited using various filter conditions) is returned to the cloud-based database. In another example, the data artifacts 236, 238 can be local data artifacts that maintain a primary copy of relevant data, or can be replicated data artifacts. In a further example, at least one higher level artifact can reference a lower-lever artifact.

The schema 230 further includes a second set of data artifacts 244, 246 that are runtime objects that correspond to the cube modelling object 210 and the modelling object 214, respectively (and in turn can be thought of as alternate instances of the data artifacts 236, 238). The data artifacts 244, 246 are associated with a second type of data source that is different than the first type of data source.

With the different data artifacts 236, 238, 244, 246 having been described, a mechanism for selecting between these data artifact instances is described. In the example of FIG. 2, switch views 250, 252 used to switch between, respectively, data artifact 236 and data artifact 244, and between data artifact 238 and data artifact 246. The operation of the switch views 250, 252 can be determined by using switch criteria 256, 258. The switch criteria 256, 258 can be implemented, in an example, using, or in a manner analogous to, "switch" statements in a programming language, such as C++. More generally, even if a "switch" programming construct is not used, similar functionality can be implemented in other ways, such as by using one or more conditional (e.g., IF, IF/ELSE) statements.

One or more conditions can be defined, where if a condition is satisfied, one data artifact instance at a given level of the schema 230 will be used. If another condition is satisfied (or a condition is not satisfied), another data artifact instance at a given level of the schema will be used. The switching criteria 256, 258 can include a default condition that selects a particular data artifact instance at a particular level of the schema 230. Although the schema 230 illustrates two data artifact instances for a given switch view (or, more generally, a switch or switch criteria, regardless of whether embodied within a view), a switch view can have more than two data artifact instances as possible targets.

Switch criteria can be specified in any suitable manner. One example of switch criteria is operations, data sources, or values specified in a data request (e.g., a database query, such as in SQL). For instance, a join that involves a particular database table, or a particular column of a database table, can be used to select one of multiple possible data sources. Or, that a join operation is specified at all can be sufficient to select one of multiple possible data artifact instances. Data requests can be given names or identifiers, and these names or identifiers can be used to select a data artifact instance. Similarly, an identifier of a user, computing system, application, or application process may be used to select between data artifact instances. Data requests may contain, or be provided with, information useable as switching criteria. For example, a query can be sent with an indicator or flag indicating whether it is time sensitive or whether data accuracy (i.e., obtaining most recent data) is preferred.

In general, switching at the switch view 252 can be handled in an analogous manner as for the switch view 250. However, complications can arise. For example, if a data request specifies data from both levels of the hierarchy, a question can arise as to whether the same type of switching should be applied at the level of the data artifact instances 236, 238 as for the data artifact instances 244, 246, or if the switch view 252 should independently determine which data artifact 244, 246 is to be used. Similarly, if it is determined by the switch view 250 that the data artifact 236 is to be used, but the data is to be retrieved from a lower-level artifact instance, switch view 252 may need to determine whether the data artifact 244 or the data artifact 246 should be used.

In one implementation, the data access request itself can be provided to the switch view 252 and the determination can proceed as described for the switch view 250. In another implementation, relevant parameters are passed to the switch view 252 for a determination, but the entire data request is not sent. In yet a further implementation, the switch view 250 can cause the switch view 252 to be bypassed, either entirely or by providing input that directs the switch view 252 to select either the data artifact 244 or the data artifact 246.

As discussed above, switching criteria can be implemented to allow users or processes to prioritize certain goals, such as data access speed, data correctness (recency), processing or access consideration (e.g., if a particular data source is not available or is experiencing technical issues), among others. As the needs of a user or process can change, the user or process can change how data is accessed within the schema 230, or the switching logic can automatically enable such changes.

Note that the switching view 250 has the effect of having data for the corresponding cube modelling artifact 210 being retrieved outside of the hierarchical structure of the schema 230. That is, when the data artifact 236 is used, data from the lower-level data artifact 238 can be used. When the data artifact 244 is used, data is not obtained from the lower-level artifacts 238, 246, but is obtained directly from an artifact instance (which can be a data artifact or a definition corresponding to a data artifact specified in the data artifact 244).

In addition to simply having the capability for selecting different data artifacts for a given modelling artifact, it can be beneficial to select particular types of data access for particular data artifacts, including based on their position in a hierarchy of data artifacts. For example, it has been described that a particular data artifact can represent access to replicated data. In some cases, it can be beneficial to implement replication at lower levels, including at a lower level possible, in a hierarchy, or stack, of data artifacts. One reason for this is that data often becomes more denormalized at higher levels in a schema, which can create redundancies in data replication (e.g., the same data is replicated multiple times). In addition, use restrictions (e.g., authorizations for particular users or processes) are often implemented at higher levels of a schema, and it may be difficult to access the data at such a level without a specific authorization.

Higher-level APIs are often parameterized, which can be difficult to accommodate in data replication. Examples of parameters include parameters that identify a user, a language, or a date. A user parameter may be associated with access permissions, as described above. Some views are set to return results in only a specific language (or languages) indicated in a parameter provided as part of a data request. A date parameter can be used to indicate a specific date for which data is requested (such as "today"), as opposed to specific time intervals.

Data replication processes are often not able to accept such parameters, and if the parameters are not provided data may not be selectable for/from a view. Accordingly, these views may be set to obtain data via federation (where the parameters are supported). Views at lower levels of a hierarchy may not include these parameters, and thus data replication becomes an option, and in some cases a preferred option (including, such as described above, because of data redundancy/denormalization issues/parameters not being defined at such lower levels, such that obtaining data by federation may not be feasible.

While it can be beneficial to use replicated data sources at lower levels of a hierarchy, it can be advantageous to use data federation at higher levels of the hierarchy. For instance, because access permissions/authorizations are often specified at higher levels of a hierarchy, this information can be helpful in obtaining data from a federated data source (because authorization to lower-level data artifacts may not be defined/specified).

Figure 3:
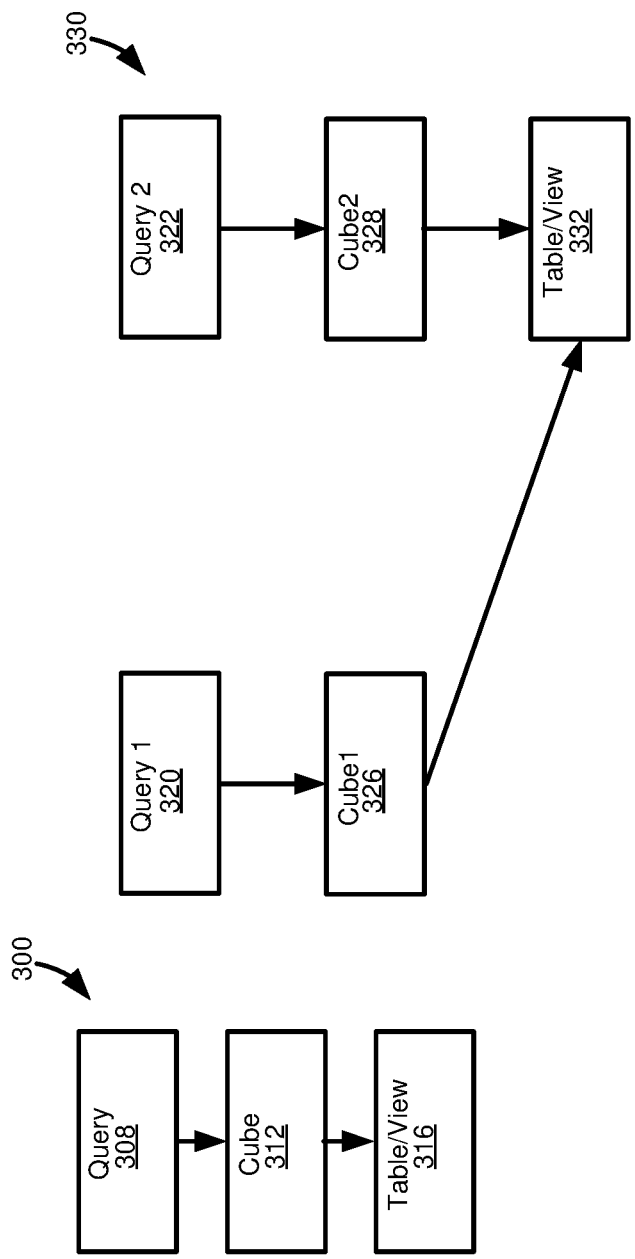
FIG. 3 is a diagram illustrating a data artifact schema that includes multiple instances of a data artifact corresponding to an artifact in a modeling schema.

Example 4— Example Data Artifact Schema with Multiple Data Artifact Instances, Including a Instance Referencing a Lower-Level Data Artifact FIG. 3 represents an alternate technique for implementing disclosed technologies. This technique can be helpful when switch views, or analogous logic, is not available or is not able to implement desired functionality. For instance, if switch views exist, but it is not feasible to pass data request or parameters through a schema, the technique illustrated in FIG. 3 may find use.

FIG. 3 is similar to FIG. 2, in that it includes a data model 300 and a schema 330, such as a schema of runtime data artifacts. The data model 300 is slightly more complex than the data model 200, in that the data model 300 includes a query modelling artifact 308 in addition to a cube modelling artifact 312, and a table or view artifact 316 (or other type of data artifact, construct, or object).

The schema 330 is shown as containing alternate data artifacts 320, 322 corresponding to the query modeling artifact 308, and alternate data artifacts 326, 328 corresponding to the cube modelling artifact 312. In this case, only a single data artifact 332 is provided that corresponds to the table or view modelling artifact 316. The reason for this is that, while data artifacts 320, 326 can obtain data from data artifacts lower in the hierarchy of the schema 330, the data artifact 332 is at the lowest level of the schema, and this data is not available from a lower level-artifact in the schema 330. Thus, data for the data artifact 332 must be obtained from a data source outside the hierarchy, such as using data federation. If the data source implementing the schema 330 has data available (whether local, replicated, cached, etc.), then multiple data artifacts can be provided for each data artifact, regardless of hierarchical level, such as described in conjunction with FIG. 2.

Otherwise, data artifacts 320, 326 can implemented as described for the data artifacts 236, 238 of FIG. 2, and data artifacts 322, 328 (and 332) can be implemented as described for the data artifacts 244, 246.

Given the absence of explicit switching logic, other mechanisms can be used to select data artifact instances at different levels of the hierarchy (where multiple data artifacts are defined, not all levels of a hierarchy are required to have multiple data artifact instances, at least in some implementations). In some cases, a user can manually select particular data artifact instances for a query, where information can be provided allowing a user to understand the nature of data access for given data artifacts (e.g., the query can be labelled "view stack" or "federation"). Similarly, such queries may be defined for a user and a user can simply select the appropriate query (where information about the query, at least as to what benefit might be achieved by selecting one query over another, can be provided). In other cases, some or all of the criteria described for the switch views 250, 252 can be used to define (or modify) a query. For instance, data artifacts can be named using standard naming conventions. When a query is received, the switching rules/criteria can be used to select the relevant data artifact names to be used in query execution.

Configuration of the schema 330 can be implemented, if desired, as described for the schema 230. That is, it may be beneficial to use replication at lower levels of the hierarchy and federation at higher levels of the hierarchy.

Example 5— Example Data Artifact Instances Which Include Additional Data Source Options In some cases, a data artifact instance, or data artifact, can also provide flexible data access. Examples 10-12 provide details of one technique for implementing such data artifacts, including as data artifacts in a database schema. Additional examples of such data artifacts are virtual tables and fabric virtual tables as implemented in technologies available from SAP SE, of Walldorf, Germany.

In an example, a data artifact (or instance, referred to hereinafter as a data artifact for ease of presentation) includes a logical pointer. The logical pointer can be updated to point to different data sources/data locations. For example, a logical pointer can be updated to point to a federated table or a replicated table. Other data sources that can be referenced using the logical pointer include local tables, cached tables, tables in dynamic storage (e.g., storage where data is migrated between different storage types, such as using an algorithm that attempts to place more important data in storage having faster access times), or data in a data lake in cloud-based storage.

In some cases, such as when data is concurrently available in multiple locations, the value of the logical pointer can be updated on the fly to point to a suitable storage location. If desired, the logical pointer can be reverted to an original or default value once a data access request has been satisfied. In other cases, it may be undesirable to allow individual data access requests to modify a logical pointer value indicating a data source for the data artifact.

In other cases, the value of the logical pointer for the data artifact can be varied, such as based on the performance of a data source, performance of data access queries, or based on other considerations, but independent of any particular data access request. For example, a data source administrator may determine that a replica table should be used in place of a federated table if query speed outweighs issues with data in a replica table potentially being out of date compared with a data source being replicated.

Example 6— Example Facilitated Creation of Data Artifact Instances

As explained with respect to a particular example artifact discussed in Example 8, disclosed technologies can facilitate the creation of data artifact instances, relationships between data artifacts, and the execution of data access requests using a data artifact instance using disclosed techniques.

For example, logic can be implemented that automatically creates data artifact instances for a modelling artifact. Such action can be explicitly requested. For example, a command or user process can call functionality to create data artifact instances for artifacts in a particular artifact schema or for selected artifacts. Or, a schema or artifacts in the schema can have annotations indicating that data instances should be created. Instructions to create data artifact instances can include information usable to help determine the nature of the data artifact instances, to configure logic used to select between data artifact instances, and to establish relationships between data artifacts and data artifact instances at different levels of a hierarchy of data artifacts. A schema can be analyzed to determine which artifacts have been selected for data artifact instance creation, and suitable data artifacts (and optionally switching logic) created.

Example 7— Example Artifact Code

Figure 4:
FIG. 4 presents example code illustrating how artifacts can be annotated with information that facilitates the creation of multiple data artifact instances and processing of data access queries using such data artifact instances.

FIG. 4 illustrates example code 400 (in pseudo-CSN) for defining an artifact 404, such as a modelling artifact, including annotating the artifact to indicate that the artifact should be created with flexible deployment options.

In a definition 408 for the artifact 404, "I_Product", annotation 410 indicates that data artifacts should be created for the artifact to allow flexible access to data associated with the artifact through the token 412 (indicating variable deployment) and the value 414 (true, indicating the variable deployment is enabled). The code 400 also specifies two data artifacts 416, 420 to be created to provide the variable access.

The code 400 provides a general format to illustrate annotation of artifacts to assist or enable creation of data artifacts. In practice, the code 400 can include additional details for the artifact 404 and the data artifacts 416, 420. For the artifact 404, the code 400 can include definitional information such as a selection of data from one or more data sources, a definition of additional data elements, modification of data elements from referenced data sources, or information indicating how data that will be associated with the data artifacts 416, 420 is to be processed or how such data can be used. Similar details can be included for the data artifacts 416, 420.

In the case of the data artifact 416, the code 400 can specify another artifact, such as a modelling artifact or a data artifact, that is referred to by the data artifact. That is, such as has been described, artifacts can refer to artifacts at lower levels of a hierarchy. Thus, the data artifact 416 can specify a lower-level artifact to be used in obtaining data associated with the artifact 416.

Data artifact 420 can represent a data artifact that can refer to a replicated data source or a federated data source, including being able to be updatable between specifying either of these particular data sources. The code for the data artifact 420 can optionally contain an initial assignment of a data source.

In other cases, rather than having the data artifacts 416, 420 specified in the code, logic can be used to automatically define, at least partially, data artifacts that correspond to the artifact 404. The token (or command or flag) 412 can provide an indication that such action should be taken.

The code 400 can provide one or both of deployment hints 430 and runtime hints 434. Deployment hints 430 can assist in determining, for example, where data sources should be created or data source types (e.g., replicated, federated, local). Runtime hints 434 can include information that can help to route data access requests between the data artifacts 416, 420, such as has been previously described. Runtime hints 434 can also indicate data artifacts that are related to the data artifacts 416 or 420, including defining relations to lower-level data artifacts/data artifact instances for purposes of the data artifact 416, or so that switching or routing information can be sent to related data artifacts. The runtime hints 434 can also be used to create linkages between the artifact 404 and the data artifacts 416, 420.

Example 8— Example Code Illustrating Disclosed Technologies

FIG. 5 illustrates code 500 (in pseudo-CSN, or a format similar to CSN) that can be included in an artifact, such as a modelling artifact. The code 500 includes a plurality of data elements 504 specified for the artifact, where at least a portion of the data elements 504 can be associated with data in (or obtainable using) one or more data artifacts created using disclosed technologies. A given data element 504 can be associated with a name/identifier 508 and a type 510.

The code 500 also includes a data selection for an artifact, in the form of a query 520. The query 520 identifies a particular data source 524 (such as a table or a view), in this case having the name "I_SalesDocument," and particular data categories 528 (e.g., fields/columns of a table or view, which can be defined as data elements in the data source 524).

Figure 6:
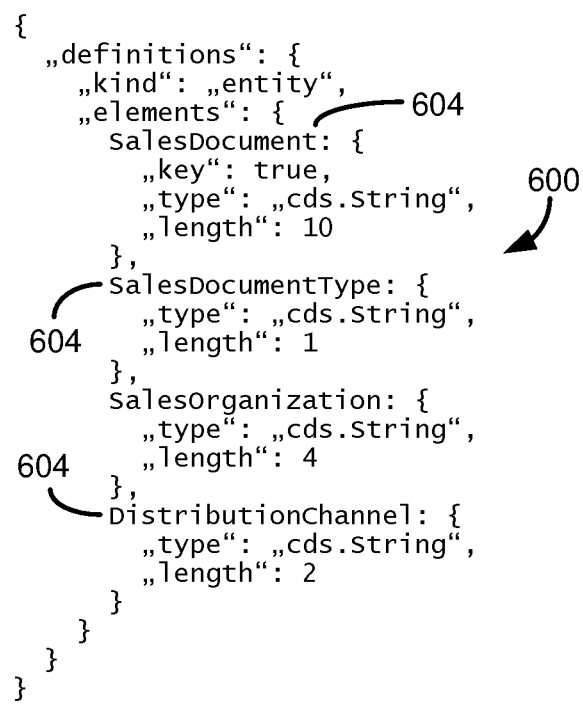
FIG. 6 presents code for a base-level modelling artifact on which the higher-level modelling artifact of FIG. 5 builds.

FIG. 6 illustrates code 600 for the "I_SalesDocument" artifact 524 referred to by the code 500. In this case, the code 600 only defines data elements 604, rather than selecting data from another data source. Artifact 524 can thus be considered as a "base," or lowest-level" artifact, since it does not depend on any other artifacts.

FIG. 7 illustrates example code 700 (in pseudo-CSN, or a format similar to CSN) that defines switching logic that can be used to determine, for at least one level of a hierarchy of data artifacts having a plurality of data artifacts that can be used in processing data access requests, a data artifact to be used in processing a particular data access request. In particular, the code 700 can represent an example of a switch view 250, 252 of FIG. 2.

Statement 710 creates a data artifact, is this case a view, that can be referenced by a data access request (or it can be determined that the data artifact should be used in processing a given data access request). The code 700 further defines a plurality of conditional (case) statements 720. For each conditional statement 720, an input value (or flag) is checked to determine whether the input value specifies that a remote data source 724 should be used (or, more particularly, that particular data elements, such as columns, of the remote data source should be used). If so, data is selected from the remote data source 724. If not, data is selected from a data artifact 728 at a lower level of a data artifact hierarchy.

FIG. 8 illustrates code 800 (e.g., in pseudo-CSN or a format similar to CSN) creating the data artifact 728, and code 850 creating the remote data source 724. Note that the code 800 includes a data selection operation 810 that selects data from the data artifact 524 referenced in the code 500. Thus, depending on the outcome of the switching logic in the code 700, data is either obtained from a lower-level data artifact or from a remote data source.

Figure 9:
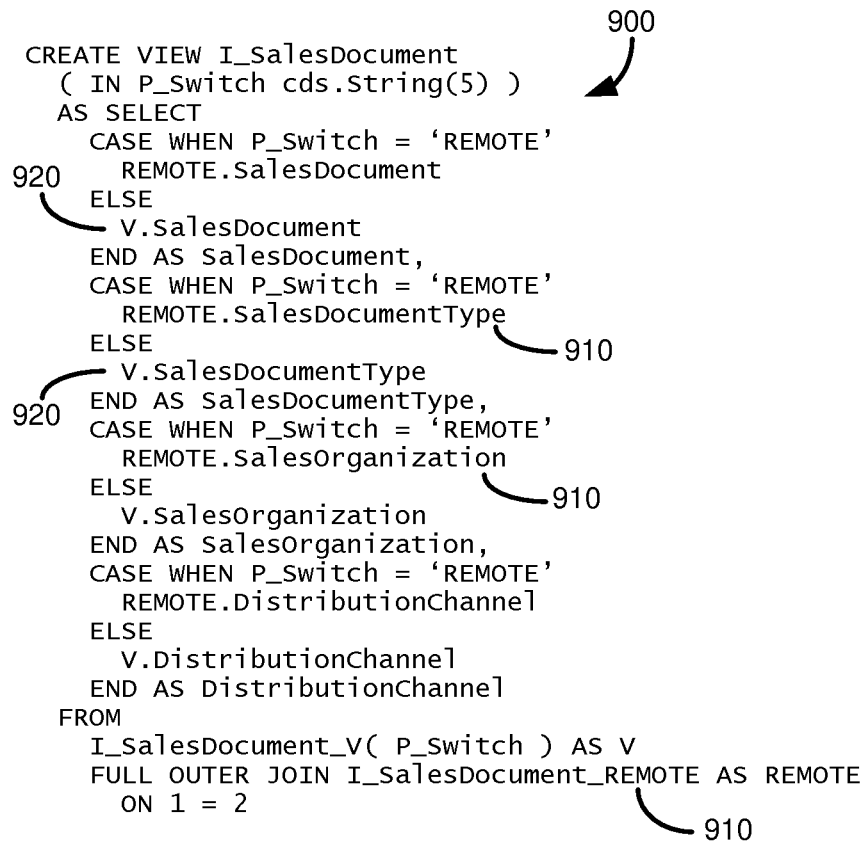
FIG. 9 presents example code for switching logic for at least one data artifact corresponding to the base-level modelling artifact of FIG. 6.

FIG. 9 illustrates code 900 that defines switching logic for the "I_SalesDocument" artifact 524 defined in the code 600. The code 900 is generally structured as described for the code 700. As the artifact 524 is a base artifact, in some cases the code 900 is not required. However, it can be beneficial to include the switching logic to help avoid confusion in writing or executing data access requests.

Although the code 900 is shown as referencing a remote data source 910 and the data artifact in the data artifact hierarchy 920, in some cases, if only a remote data source is present all of the conditional statements can indicate the use of the remote data source. Or, the data artifact in the data artifact hierarchy can reference the remote data source, so that data is correctly obtained, as illustrated in the code 1000 of FIG. 10. Similar definitions can be used in other cases, where single data source is available, such as only having a local data source or only having a replicated data source.

FIG. 11 illustrates a definition 1100 for the remote data source 724.

Example 9— Example Flexible Access Use Scenarios

Disclosed technologies that provide variable access to data, including automatically determining access types at runtime or through manual or semi-automated methods, can be used in a variety of scenarios. As has been mentioned, some scenarios involve determining whether reducing data latency or reducing processing workload or processing time are more important. However, there are particular use cases where these considerations may be relevant, or variable access may otherwise find use.

One use is in testing or demonstrating data access software. For instance, data replication can be resource intensive. When building and testing a software solution, it may be beneficial to obtain data via federation, as that can be a more lightweight process. Once a system is ready for deployment, some of all of the data artifacts can be set to access data using data replication instead of data federation.

The ability to switch between different access modalities can also be useful in determining how a system should be configured, at least initially, as, for example, the performance of data federation can be evaluated against the performance of data replication to help determine default access techniques and under what conditions different access techniques should be used (e.g., to define switching logic). This information can also be used dynamically at runtime to determine what access method provides the best cost/benefit results, where switching can occur if indicated as beneficial using various criteria (e.g., threshold performance parameters may be set to determine when switching should occur).

Variable access can also facilitate top-down modelling approaches. Such approaches can be taken by end users (e.g., developers working for a company that is customizing a software solution from another provider or creating models ab initio). Top-down modelling can be useful for a number of reasons, including because it may be easier to start defining artifacts based on how they will be used in a software application before determining a model that is best for storing data referenced by higher-level artifacts. Top-down modelling can also assist in having the most knowledge/relevant users define artifacts. In the above example, an application developer, data scientist, or end user may be in the best position to know what data is needed and the best format for accessing the data (including based on application performance considerations), but a database administrator may be most familiar with the performance of a database in which the underlying data in stored.

Top-down modelling can facilitate users not only switching from working with tables to views (or, more generally, from high-level artifacts to lower level artifacts, including lower-level artifacts that store data used by higher-level artifacts), but also switching between different access methods. As has been described, artifacts at higher-levels may benefit from accessing data through federation rather than replication, while replication might be more advantageous at lower levels of a modelling/data artifact hierarchy.

Variable access an also be used in previewing data. For example, if a replication process is being defined or evaluated, a preview of data to be replicated can be obtained via federation. That is, some or all of data in a model being created can eventually be obtained via replication, but during modelling ore replications setup data can be obtained via federation.

In a similar manner, variable data access using disclosed techniques can facilitate ad-hoc modelling, such as by a particular department of a company that is using a particular data store (such as a database). Often, such models are initially created using data federation, at least in part because users may not have permission to initiate data replication, such as because of the associated processing load. However, at some point it may be desirable to switch access to data replication, such as if an ad-hoc model proves to be particularly useful or is adopted more widely.

The ad-hoc model can be adapted for replication scenarios by adding or configuring suitable data artifacts (e.g., defining a replication process for a data artifact instance that obtains data via replication). These scenarios are also beneficial, as obtaining data via replication or federal can be simpler, and less resource intensive, than implementing ETL (extract, transform, load) processes to obtain a source of data (which could be then treated, for example, as local data). In addition, both data federation and replication can help reduce the staleness of data, since ETL processes typically are carried out less frequently than replication processes.

Variable access can be used to provide data fallback techniques. For instance, if data access is "normally" via data federation, and a federation process is not available, data can be obtained via data replication, even if replicated data may be somewhat out of date compared with what might have been available via federation. Similarly, if a replication process fails, or replica data sources are not available, data may be obtained via federation, even if it may result in longer processing times.

Disclosed techniques can help reduce modelling effort by allowing greater reuse of both models and runtime artifacts. That is, for one user, data replication may be preferable. For another user, data federation may be perforable. Rather than each user having to develop separate artifacts, the same artifacts can be used, with different users using different types of artifact instances or switching logic.

Disclosed techniques can also be used to check the consistency of data obtainable using different access techniques. Among other things, this can help determine whether data latency associated with replication is tolerable, or if data should instead be obtained using data federation. Consistency checking can also be used to help determine whether access permissions associated with data federation result in data that matches what is retrieved using data replication.

Example 10— Example Operations Implementing Disclosed Technologies

Figure 12:
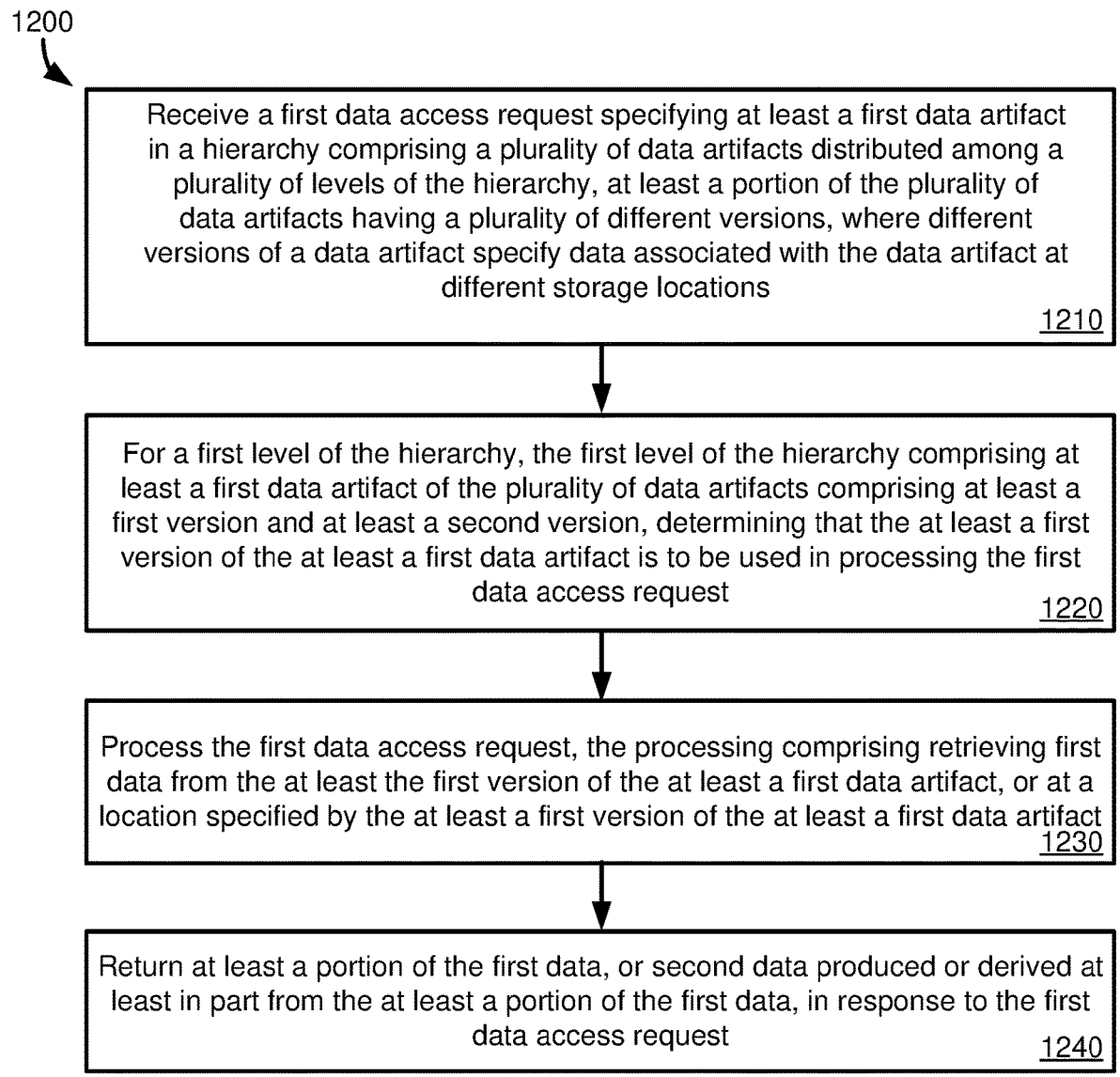
FIG. 12 is a flowchart of example operations in processing a data access request that can use one of two instances of a data artifact.

FIG. 12 is a flowchart of a method 1200 that can be used to process a data access request, where a selection is made between two or more instances of a data artifact to be used in executing the data access request.

At 1210, a first data access request is received. The first data access request specifies at least a first data artifact in a hierarchy that includes a plurality of data artifacts distributed among a plurality of levels of the hierarchy. At least a portion of the plurality of data artifacts have a plurality of different instances. Different instances of a data artifact specify data associated with the data artifact at different storage locations.

A first level of the hierarchy includes at least a first data artifact of the plurality of data artifacts that includes at least a first instance and at least a second instance. It is determined at 1220 that the at least a first instance of the first data artifact is to be used in processing the first data access request.

At 1230, the first data access request is processed. The processing at 1230 includes retrieving first data from at least the first instance of the data artifact, or at a location specified by the at least a first instance of the first data artifact. At least a portion of the first data, or second data produced or derived at least in part from the at least a portion of the first data, is returned in response to the data access request at 1240.

Figure 13:
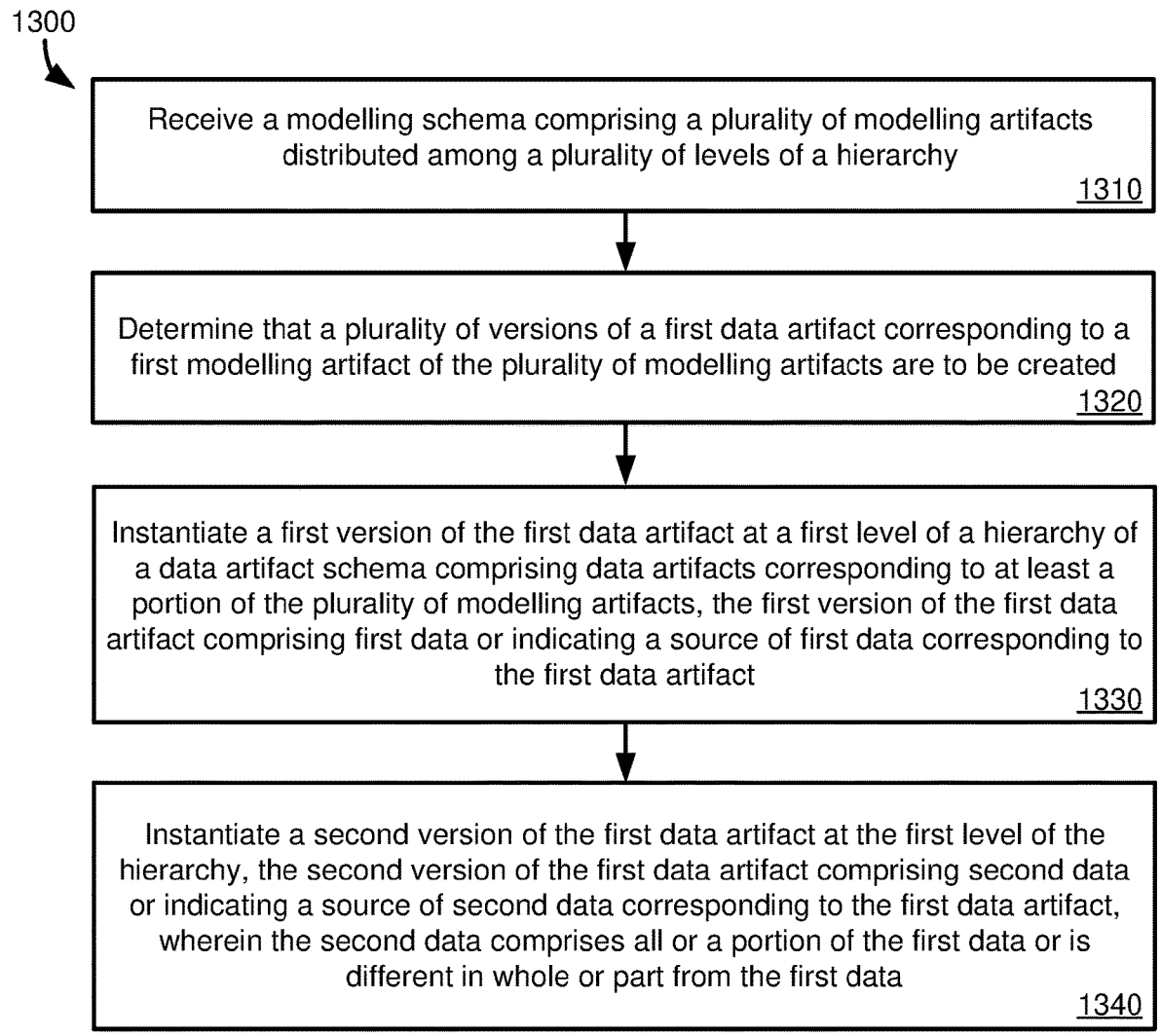
FIG. 13 is a flowchart of example operations in creating data artifact instances based on a modelling artifact.

FIG. 13 is a flowchart of a method 1300 for instantiating multiple data artifact instances corresponding to a modelling artifact.

At 1310, a modelling schema is received that includes a plurality of modelling artifacts distributed among a plurality of levels of a hierarchy. It is determined at 1320 that a plurality of instances of a first data artifact corresponding to a first modelling artifact of the plurality of modelling artifacts are to be created. A first instance of the first data artifact is instantiated at 1330. The first instance of the first data artifact is instantiated at a first level of a hierarchy of a data artifact schema that includes data artifacts corresponding to at least a portion of the plurality of modelling artifacts. The first instance of the first data artifact includes first data, or indicates a source of first data corresponding to the first data artifact. At 1340, a second instance of the first data artifact is instantiated at the first level of the hierarchy. The second instance of the first data artifact includes second data or indicates a source of second data corresponding to the first data artifact. The second data includes all or a portion of the first data or is different in whole or part from the first data.

Figure 14:
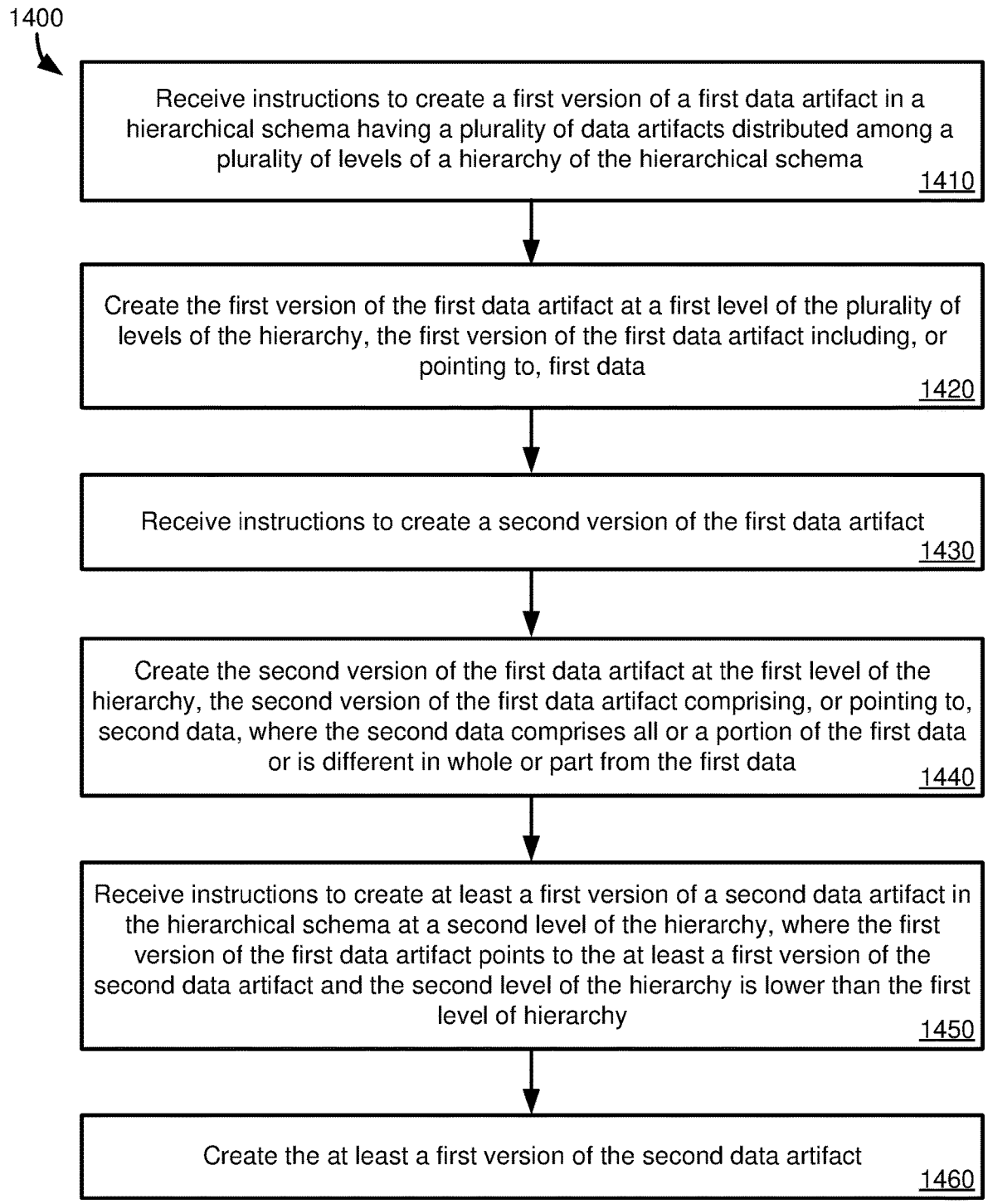
FIG. 14 is a flowchart of example operations in creating a data artifact hierarchy, where a higher-level data artifact instance references a lower-level data artifact, or data artifact instance.

FIG. 14 is a flowchart of a method 1400 for creating multiple instances of a data artifact.

At 1410, instructions are received to create a first instance of a first data artifact in a hierarchical schema that includes a plurality of data artifacts (which can be represented as multiple data artifact instances) distributed among a plurality of levels of a hierarchy of the hierarchical schema. A first instance of the first data artifact is created, at 1420, at a first level of the plurality of levels of the hierarchy. The first instance of the first data artifact includes, or points to, first data.

Instructions to create a second instance of the first data artifact are received at 1430. At 1440, the second instance of the first data artifact is created at the first level of the hierarchy. The second instance of the first data artifact includes, or points to, second data.

The second data includes all or a portion of the first data or is different in whole or part from the first data.

Instructions are received at 1450 to create a least a first instance of a second data artifact in the hierarchical schema at a second level of the hierarchy. The first instance of the first data artifact points to the at least a first instance of the second data artifact and the second level of the hierarchy is lower than the first level of the hierarchy. The at least a first instance of the second data artifact is created at 1460.

Example 11— Example Architecture for Virtual Tables Having Remote or Replica Target Tables FIG. 15 illustrates an architecture 1500 in which disclosed embodiments can be implemented. The basic architecture 1500 of FIG. 15 includes a number of features that can be common to different embodiments of the disclosed technologies, including one or more applications 1508 that can access a central computing system 1510, which can be a cloud computing system. The central computing system 1510 can act as such by providing access to data stored in one or more remote database systems 1512. In turn, the remote database systems 1512 can be accessed by one or more applications 1514. In some cases, an application 1514 can also be an application 1508. That is, some applications may only (directly) access data in the central computing system 1510, some applications may only access data in a remote database system 1512, and other applications may access data in both the central computing system and in a remote database system.

Other Examples described herein can include components in addition to the applications 1508, 1514, the remote database systems 1512, and the central computing system 1510. In addition, components 1508, 1510, 1512, 1514 of the architecture, particularly the central computing system 1510, can be configured differently between the different Examples, as will be further described.

The central computing system 1510 can include a query processor 1520. The query processor 1520 can include multiple components, including a query optimizer 1522 and a query executor 1524. The query optimizer 1522 can be responsible for determining a query execution plan 1526 for a query to be executed using the central computing system 1510. The query plan 1526 generated by the query optimizer 1522 can include both a logical plan indicating, for example, an order of operations to be executed in the query (e.g., joins, projections) and a physical plan for implementing such operations. Once developed by the query optimizer 1522, a query plan 1526 can be executed by the query executor 1524. Query plans 1526 can be stored in a query plan cache 1528 as cached query plans 1530. When a query is resubmitted for execution, the query processor 1520 can determine whether a cached query plan 1530 exists for the query. If so, the cached query plan 1530 can be executed by the query executor 1524. If not, a query plan 1526 is generated by the query optimizer 1522. In some cases, cached query plans 1530 can be invalidated, such as if changes are made to a database schema, or at least components of a database schema (e.g., tables or views) that are used by the query.

A data dictionary 1534 can maintain one or more database schemas for the central computing system 1510. In some cases, the central computing system 1510 can implement a multitenant environment, and different tenants may have different database schemas. In at least some cases, at least some database schema elements can be shared by multiple database schemas.

The data dictionary 1534 can include definitions (or schemas) for different types of database objects, such as schemas for tables or views. Although the following discussion references tables for ease of explanation, it should be appreciated that the discussion can apply to other types of database objects, particularly database objects that are associated with retrievable data, such as materialized views. A table schema can include information such as the name of the table, the number of attributes (or columns or fields) in the table, the names of the attributes, the data types of the attributes, an order in which the attributes should be displayed, primary key values, foreign keys, associations to other database objects, partition information, or replication information.

Table schemas maintained by the data dictionary 1534 can include local table schemas 1536, which can represent tables that are primarily maintained on the central computing system 1510. The data dictionary 1534 can include replica table schemas 1538, which can represent tables where at least a portion of the table data is stored in the central computing system 1510 (or which is primarily managed by a database management system of the central computing system, even if stored other than on the central computing system, such as being stored in a data lake or in another cloud service). Tables having data associated with replica tables schemas 1538 typically will periodically have their data updated from a source table, such as a remote table 1544 of a data store 1542 of a remote database system 1512.

Replication can be accomplished using one or both of a replication service 1546 of the remote database system 1512 or a replication service 1548 of the central computing system 1510. In particular examples, the replication service can be the Smart Data Integration (SDI) service, SAP Landscape Transformation Replication Server, SAP Data Services, SAP Replication Server, SAP Event Stream Processor, or an SAP HANA Direct Extractor Connection, all of SAP SE, of Walldorf, Germany.

In some cases, data in a remote database system 1512 can be accessed by the central computing system 1510 without replicating data from the remote database system, such as using federation. The data dictionary 1534 can store remote table schemas 1552 for remote tables, such as a remote table 1544 of a remote database system 1512. Data in the remote table 1544 can be accessed using a federation service 1556, such as using the Smart Data Access protocol of SAP SE, of Walldorf, Germany. The federation service 1556 can be responsible for converting query operations into a format that can be processed by the appropriate remote database system 1512, sending the query operations to the remote database system, receiving query results, and providing the query results to the query executor 1524.

The data dictionary 1534 can include virtual table schemas 1560. Virtual table schemas 1560 can be associated with a table pointer 1562 and optionally with status information 1564. The table pointer 1562 can be a logical pointer used to identify what table should be accessed for data of the corresponding virtual table schema 1560. For example, depending on the state of the table pointer 1562, the table pointer can point to the remote table 1544 of a remote database system 1512 or a replica table 1566 (which can be generated from the remote table 1544) located in a data store 1568 of the central computing system 1510. The data store 1568 can also store data for local tables 1570, which can be defined by the local table schemas 1536.

As will be further described, the table pointer 1562 can be changed between the remote table 1544 and the replica table 1566. In some cases, a user can manually change the table pointed to by the table pointer 1562. In other cases, the table pointer 1562 can be automatically changed, such as in response to the detection of defined conditions.

The status information 1564 can include an indicator identifying a virtual table schema 1560 as being associated with a remote table 1544 or a replica table 1566. The status information 1564 can also include information about the replication status of a replica table 1566. For example, once a request is made to change the table pointer 1562 to point to a replica table 1566, it may take time before the replica table is ready for use. The status information 1564 can include whether a replication process has been started, has been completed, or a progress status of generating the replica table 1566.

Changes to virtual table schemas 1560 and managing replica tables 1566 associated with virtual table schemas can be managed by a virtual table service 1572. Although shown as a separate component of the central computing system 1510, the virtual table service 1572 can be incorporated into other components of the central computing system 1510, such as the query processor 1520 or the data dictionary 1534.

When a query is executed, the query is processed by the query processor 1520, including executing the query using the query executor 1524 to obtain data from one or both of the data store 1542 of the remote database system 1512 or the data store 1568 of the central computing system 1510. Query results can be returned to the application 1508. Query results can also be cached, such as in a cache 1578 of the central computing system 1510. The cached results can be represented as cached views 1580 (e.g., materialized query results).

The applications 1514 can access data in the remote database system 1512, such as through a session manager 1586. The applications 1514 can modify the remote tables 1544. When a table pointer 1562 of a virtual table schema 1560 references a remote table 1544, changes made by the applications 1514 are reflected in the remote table. When a table pointer 1562 references a replica table 1566, changes made by the applications 1514 can be reflected in the replica table using the replication service 1546 or the replication service 1548.

Example 12— Example Database Artifacts
Supporting Virtual Tables

FIGS. 16A and 16B illustrate example database artifacts that can be used to implement the technologies of the present disclosure.

A database system can track query performance Queries that satisfy particular criteria, such as having execution times that are sufficiently long to satisfy a threshold, or otherwise has resource use that satisfies a threshold, can be designated as expensive queries. Expensive queries can be tracked, such as by creating a record for the query in a table of expensive queries.

Table 1600 of FIG. 16A lists properties for a column 1602 that can be added to a table that tracks expensive queries (e.g., M_EXPENSIVE_STATEMENTS). The column 1602, TABLE_TYPES, can list whether the query includes tables that are formatted for use in a row store, tables that are formatted for use in a column store, or tables that are associated with a virtual table schema (and thus can have variable types of target tables, such as remote tables, replica tables, or cached tables). In some cases, a query can include multiple types of tables, which case the column 1602 can include multiple values. In other cases, if a query includes multiple table types, multiple entries for the query can be included in the table of expensive queries, where each entry includes a single value for the column 1602.

In further cases, a table analogous to the table 1600 is included, but does not specifically identify table types for the query. Instead, a value, such as a Boolean value, can indicate whether the query includes any virtual tables. In another implementation, a table analogous to the table 1600 is included, but, for queries that include a virtual table, includes information specifying a target type for virtual tables in the query (e.g., remote table targets, replica table targets, cache table targets).

Table 1606 of FIG. 16A lists properties for a column 1608 that can be added to a table that lists properties for a virtual table (e.g., can be a column in a table that described a virtual table schema). The column 1608, HAS_REPLICA, can be used to provide an indicator, such as a Boolean value, indicating whether the virtual table targets a replica table. For example, if the virtual table targets a remote table, the value can be FALSE. If the virtual table is updated to target a replica table, the value can be updated to TRUE.

Table 1612 of FIG. 16A lists properties for various columns that can be included in a table, VIRTUAL_TABLE_REPLICAS, that contains information about replica tables targeted by one or more virtual table schemas. A column 1614 provides a schema name for a schema that includes the virtual table. The schema name can identify, for example, one of the schemas 714 of FIG. 7. A column 1616 lists the name of the virtual table schema in the schema provided in the column 1614. The schema name can, for example, identify a virtual table schema 718. Similarly, a column 1618 and a column 1620 can provides names for a database schema and replica table schema for the replica table referenced by the virtual table schema identified in the column 1616. Note that in some cases, the replica tables may be associated with a schema other than a particular user database schema (e.g., the schema identified in column 1614), such as a schema associated with a central computing system and used internally to manage virtual tables according to the present disclosure.

A column 1622 can provide a type for the replica table. In some cases, the type can refer to a type of replication used for the replica table, such as whether asynchronous or synchronous replication is used to replicate data from the source table (e.g., a remote table) to the replica table. In other cases, the type can refer to how queries are processed while a replica table is being prepared. A designation of asynchronous can result in a remote table continuing to be used for queries while the replica table is being prepared. In other words, a DDL statement altering the table status can be effective before the query behavior actually changes. A designation of synchronous can result in queries being rejected or held until the replica is complete—in which case the DDL change and query behavior change are essentially concurrent. In further implementations, a designation of synchronous in column 1622 can indicate that a federated table (or otherwise a table location currently reflected in the value of the table pointer, such as a location of the table in a virtual table cache) should be used for queries until an up to date replica table is available, and a designation of asynchronous indicates that the replica table should immediately be used for queries, even if it is not up to date as compared with its source table (e.g., the remote or federated table).

A column 1624 can indicate whether a replica table is currently being used by a virtual table. That is, if the value for column 1624 is FALSE, then a remote table may be specified as the target for the virtual table schema. If the value for the column 1624 is TRUE, replication of the remote table is enabled, and the virtual table schema targets the replica table.

A column 1626 can be used to indicate whether a replica table can be shared by multiple virtual tables (e.g., with different database schemas of multiple users), such as having a value of TRUE if the table is shareable and FALSE otherwise. A column 1628 can be used to indicate how data for a replica table will be loaded, such as when the replica table is stored in a system with dynamic storage. Values for the column 1628 can indicate whether the table is either maintained entirely in persistent storage or in a buffer cache, is loadable by pages, or is loadable by particular columns. If the replica table is also a shared table, various protocols can be used to determine the value of column 1628. For example, if multiple users request a replica table, but using a different value of column 1628, a protocol can select that the last requested value be used for column 1628. That is, if a replica table already exists, a request to create a replica table with a different value for column 1628 than a current value can result in a change to the value in column 1628 for the existing replica table, rather than creating a new replica table.

Or, some values for column 1628 can be given precedence. For example, if any virtual table schema requests that a replica table be column loadable, that value will override any request that the replica table be page loadable. However, if a schema associated with a request for a column loadable table elects to drop a replica table (e.g., to switch to a remote table), but other schemas are using the replica table, the request to drop the replica table can result in the replica table being changed from column loadable to page loadable, at least absent another explicit request having been received from another database schema that the replica table should be column loadable.

Referring to FIG. 16B, a table 1660 can be used to track information for replica tables. The table 1660 can be used to provide additional information for replica tables, such as for monitoring the status of replica tables. The table 1660 can include a column 1662 that includes host information and a column 1664 that includes port information for a system where the replica table can be accessed (and can be used, for example, to indicate whether the replica table is located in memory, in a buffer cache, in persistent storage, in a data lake, etc.).

The table 1660 includes columns 1666, 1668, 1670, 1672 for a schema name for the replica table, a table name for the replica table, a schema name for the virtual table, and a schema name for the virtual table, which can be implemented at least generally as described for the columns 1618, 1620, 1614, 1616 for the table 1612 of FIG. 16A. A column 1670 can specify a replica type, and can be implemented at least generally as described for the column 1622 of table 1612.

A replica table can be associated with subsets, such as partitions. A column 1676 can be used to indicate a particular table partition associated with a record of the table 1660, where a value of "0" can be used for nonpartitioned tables.

A column 1680 can be used to indicate a status for the replica table, such as whether replication is disabled, enabled, or if a replica is currently being generated. In some cases, whether replication is disabled or enabled can be correlated with whether any virtual table schema targets the replica table. However, in some cases, tables can be replicated even if they are not currently targeted by a virtual table schema. If a replica is in the process of being generated, the progress of the replica generation process can be recorded in a column 1678 (e.g., whether the replication process is 25% complete, 50% complete, 75% complete, 99% complete, etc.).

Replication can be enabled or disabled, including depending on whether a virtual table schema targets a replica table. Times associated with enabling or disabling replication can be recorded in columns 1682, 1684, respectively.

Replica tables can be shared, in some implementations. When replica tables are shareable, a column 1686 can be used to indicate a number of virtual table schemas that target a given replica table.

Example 13— Example Query Language Operations Supporting Virtual Tables

FIG. 17 illustrates example query language statements, such as DDL statements, that can be used to implement various features described in the present disclosure, including as described in Examples 10 and 11. Statement 1708 is an example statement for creating a virtual table that targets a replica table created from a remote table. The statement 1708 includes arguments for the name of the virtual table, the location of the remote table (which can include the remote table name), optionally any properties to be specified for the remote table/location, an indicator of whether the replica table will be shared, optionally information partitioning the replica table, optionally any load unit parameters for the replica table (e.g., whether the replica table will be page loadable or column loadable), and a location for the replica table (e.g., at a location associated with in-memory tables, in data lake, at a location managed by a dynamic storage manager).

Statement 1712 is an example command to create a replica table for a remote table being targeted by a virtual table schema. The statement 1712 includes arguments for the name of the virtual table, whether the table will be shared, optionally information regarding partition information or load unit information, as described for the statement 1708, and a location for the replica table.

Statement 1716 is an example command to drop a replica table. The statement 1716 takes as arguments the name of the virtual table schema and an identifier of whether all replicas should be dropped or only replicas at one or more specified locations.

If a virtual table schema is associated with a remote table and a replica table, statements 1720, 1722 can used to switch between targeting the replica table and targeting the remote table, respectively. The statements 1720, 1722 take as arguments the name of the virtual table schema, and an identifier as to whether all, or one or more specified, replicas should be targeted or not targeted.

Statement 1726 can be used to change the location of a replica table, such as between primary database storage (e.g., in-memory storage) and persistent storage, dynamic storage, or external storage, such as storage in a data lake. The statement 1726 takes as arguments the name of the virtual table schema, the current location of the replica table, and the location to which the replica table should be moved.

Properties, such as partition information or a load unit type, can be changed for a replica table using the statement 1730. Arguments for the statement 1730 include the name of the virtual table schema, the replica table location, and an indicator of the property being changed, such as partition information or load unit information.

Query language statements can be used to create, or modify, tables to select other aspects of the disclosed technologies for use (or non-use). For example, a DDL statement to create a table can include an option to enable caching (e.g., in the virtual table cache 1504 of FIG. 15). DDL statements can be used to alter cache behavior for existing tables, such as to enable or disable caching. Similarly, cache behavior can be altered, such as specifying whether data should be prospectively placed in the cache or fetched and cached upon a request for data. Cache options, including cache size or priorities for particular tables (e.g., being useable to determine which tables should be removed from the cache when full), can also be specified by DDL statements or similar commands.

Example 13— Computing Systems

FIG. 18 depicts a generalized example of a suitable computing system 1800 in which the described innovations may be implemented. The computing system 1800 is not intended to suggest any limitation as to scope of use or functionality of the present disclosure, as the innovations may be implemented in diverse general-purpose or special-purpose computing systems.

With reference to FIG. 18, the computing system 1800 includes one or more processing units 1810, 1815 and memory 1820, 1825. In FIG. 18, this basic configuration 1830 is included within a dashed line. The processing units 1810, 1815 execute computer-executable instructions, such as for implementing the features described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 18 shows a central processing unit 1810 as well as a graphics processing unit or co-processing unit 1815. The tangible memory 1820, 1825 may be volatile memory (e.g., registers, cache, RAM), non-volatile memory (e.g., ROM, EEPROM, flash memory, etc.), or some combination of the two, accessible by the processing unit(s) 1810, 1815. The memory 1820, 1825 stores software 1880 implementing one or more innovations described herein, in the form of computer-executable instructions suitable for execution by the processing unit(s) 1810, 1815.

A computing system 1800 may have additional features. For example, the computing system 1800 includes storage 1840, one or more input devices 1850, one or more output devices 1860, and one or more communication connections 1870, including input devices, output devices, and communication connections for interacting with a user. An interconnection mechanism (not shown) such as a bus, controller, or network interconnects the components of the computing system 1800. Typically, operating system software (not shown) provides an operating environment for other software executing in the computing system 1800, and coordinates activities of the components of the computing system 1800.

The tangible storage 1840 may be removable or non-removable, and includes magnetic disks, magnetic tapes or cassettes, CD-ROMs, DVDs, or any other medium which can be used to store information in a non-transitory way, and which can be accessed within the computing system 1800. The storage 1840 stores instructions for the software 1880 implementing one or more innovations described herein.

The input device(s) 1850 may be a touch input device such as a keyboard, mouse, pen, or trackball, a voice input device, a scanning device, or another device that provides input to the computing system 1800. The output device(s) 1860 may be a display, printer, speaker, CD-writer, or another device that provides output from the computing system 1800.

The communication connection(s) 1870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14— Cloud Computing Environment

Figure 19:
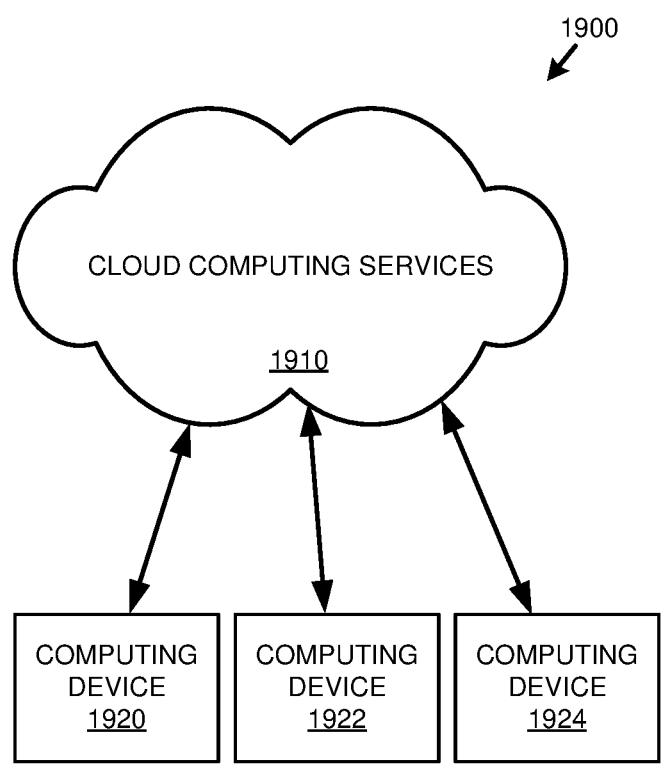
FIG. 19 is an example cloud computing environment that can be used in conjunction with the technologies described herein.

FIG. 19 depicts an example cloud computing environment 1900 in which the described technologies can be implemented. The cloud computing environment 1900 comprises cloud computing services 1910. The cloud computing services 1910 can comprise various types of cloud computing resources, such as computer servers, data storage repositories, networking resources, etc. The cloud computing services 1910 can be centrally located (e.g., provided by a data center of a business or organization) or distributed (e.g., provided by various computing resources located at different locations, such as different data centers and/or located in different cities or countries).

The cloud computing services 1910 are utilized by various types of computing devices (e.g., client computing devices), such as computing devices 1920, 1922, and 1924. For example, the computing devices (e.g., 1920, 1922, and 1924) can be computers (e.g., desktop or laptop computers), mobile devices (e.g., tablet computers or smart phones), or other types of computing devices. For example, the computing devices (e.g., 1920, 1922, and 1924) can utilize the cloud computing services 1910 to perform computing operations (e.g., data processing, data storage, and the like).

Example 15— Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 18, computer-readable storage media include memory 1820 and 1825, and storage 1840. The term computer-readable storage media does not include signals and carrier waves. In addition, the term computer-readable storage media does not include communication connections (e.g., 1870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions, that, when executed, cause the computing system to perform operations comprising:
   receiving instructions to create a first instance of a first data artifact in a hierarchical schema comprising a plurality of data artifacts distributed among a plurality of levels of a hierarchy of the hierarchical schema;
   creating the first instance of the first data artifact at a first level of the plurality of levels of the hierarchy, the first instance of the first data artifact comprising, or pointing to, first data;
   receiving instructions to create a second instance of the first data artifact;
   creating the second instance of the first data artifact at the first level of the hierarchy, the second instance of the first data artifact comprising, or pointing to, second data, wherein the second data comprises all or a portion of the first data or is different in whole or part from the first data;
   receiving instructions to create at least a first instance of a second data artifact in the hierarchical schema at a second level of the hierarchy, wherein the first instance of the first data artifacts points to the at least a first instance of the second data artifact and the second level of the hierarchy is lower than the first level of hierarchy; and
   creating the at least a first instance of the second data artifact.

2. The computing system of claim 1, the operations further comprising:
   receiving a first data access request, the first data access request specifying the first data artifact;
   determining that the first instance of the first data artifact is to be used in processing the first data access request;
   processing the first data access request, the processing comprising retrieving first data from at least the first instance of the first data artifact, or at a location specified by the first instance of the first data artifact; and
   returning at least a portion of the first data, or second data produced or derived at least in part from the at least a portion of the first data, in response to the first data access request.

3. The computing system of claim 2, wherein determining that the first instance of the first data artifact is to be used in processing the first data access request comprises analyzing at least one data access operation specified in the first data access request, wherein the at least one data access operation is of a type that determines at least in part that the first instance of the first data artifact is used in processing the first data access request and the second instance of the first data artifact is not used in processing the first data access request.

4. The computing system of claim 2, wherein determining that the first instance of the first data artifact is to be used in processing the first data access request comprises determining that an identifier of a source of the first data access request indicates that the first instance of the first data artifact is to be used in processing the first data access request.

5. The computing system of claim 2, wherein determining that the first instance of the first data artifact is to be used in processing the first data access request comprises determining that the first data access request comprises, or is associated with, an indicator for a first data access request type that is used, at least in part, to determine that the first instance of the at least a first data artifact is to be used in processing the first data access request.

6. The computing system of claim 2, the operations further comprising:
   receiving a second data access request, the second data access request specifying the first data artifact;
   for the first level of the hierarchy, determining that the second instance of the first data artifact is to be used in processing the second data access request;

processing the second data access request, the processing comprising retrieving third data from at least the second instance of the first data artifact, or at a location specified by the second instance of the first data artifact, wherein the third data comprises all or a portion of the first data or is different in whole or part from the first data; and returning at least a portion of the third data, or fourth data produced or derived at least in part from the at least portion of the third data, in response to the second data access request.

7. The computing system of claim 2, wherein the first data access request specifies the second data artifact, the second data artifact comprising the first instance and second instance, the operations further comprising:

determining that the first instance of the second data artifact is to be used in processing the first data access request.

8. The computing system of claim 7, wherein the determining that the first instance of the second data artifact is to be used in processing the first data access request comprises:

in response to determining that the first instance of the first data artifact is to be used in processing the first data access request, sending a command directing or indicating that the first instance of the second data artifact is to be used in processing the first data access request; or providing the first data access request or parameters or operations comprised within or associated with the first data access request to switching logic used to select between the first instance of the second data artifact and the second instance of the second data artifact, wherein the output of the switching logic is at least partially independent of the determination that the first instance of the first data artifact is to be used in processing the first data access request.

9. A method, implemented in a computing system comprising at least one hardware processor and at least one memory coupled to the at least one hardware processor, the method comprising:

receiving instructions to create a first instance of a first data artifact in a hierarchical schema comprising a plurality of data artifacts distributed among a plurality of levels of a hierarchy of the hierarchical schema;

creating the first instance of the first data artifact at a first level of the plurality of levels of the hierarchy, the first instance of the first data artifact comprising, or pointing to, first data;

receiving instructions to create a second instance of the first data artifact;

creating the second instance of the first data artifact at the first level of the hierarchy, the second instance of the first data artifact comprising, or pointing to, second data, wherein the second data comprises all or a portion of the first data or is different in whole or part from the first data;

receiving instructions to create at least a first instance of a second data artifact in the hierarchical schema at a second level of the hierarchy, wherein the first instance of the first data artifacts points to the at least a first instance of the second data artifact and the second level of the hierarchy is lower than the first level of hierarchy; and creating the at least a first instance of the second data artifact.

10. The method of claim 9, wherein the first instance of the first data artifact comprises a view referencing the at least a first instance of the second data artifact.

11. The method of claim 10, wherein the at least a first instance of the second data artifact comprises a view referencing at least a first instance of a third data artifact of the hierarchy, the at least a first instance of the third data artifact being at a lower level of the hierarchy than the at least a first instance of the second data artifact.

12. The method of claim 9, further comprising:

receiving a first data access request, the first data access request specifying that the first instance of the first data artifact is to be used in processing the first data access request; and receiving a second data access request, the second data access request specifying that the second instance of the first data artifact is to be used in processing the second data access request.

13. The method of claim 9, further comprising:

receiving a first data access request;

analyzing operations or information comprised within or associated with the first data access request;

based at least in part on the analyzing operations or information comprised within or associated with the first data access request, executing the first data access request using the first instance of the first data artifact;

receiving a second data access request;

analyzing operations or information comprised within or associated with the second data access request; and based at least in part on the analyzing operations or information comprised within or associated with the second data access request, executing the second data access request using the second instance of the first data artifact.

14. One or more computer-readable storage media comprising:

computer-executable instructions that, when executed by a computing system comprising at least one hardware processor and at least one memory coupled to the at least one hardware processor, cause the computing system to receive instructions to create a first instance of a first data artifact in a hierarchical schema comprising a plurality of data artifacts distributed among a plurality of levels of a hierarchy of the hierarchical schema;

computer-executable instructions that, when executed by the computing system, cause the computing system to create the first instance of the first data artifact at a first level of the plurality of levels of the hierarchy, the first instance of the first data artifact comprising, or pointing to, first data;

computer-executable instructions that, when executed by the computing system, cause the computing system to receive instructions to create a second instance of the first data artifact;

computer-executable instructions that, when executed by the computing system, cause the computing system to create the second instance of the first data artifact at the first level of the hierarchy, the second instance of the first data artifact comprising, or pointing to, second data, wherein the second data comprises all or a portion of the first data or is different in whole or part from the first data;

computer-executable instructions that, when executed by the computing system, cause the computing system to receive instructions to create at least a first instance of a second data artifact in the hierarchical schema at a second level of the hierarchy, wherein the first instance of the first data artifacts points to the at least a first instance of the second data artifact and the second level of the hierarchy is lower than the first level of hierarchy; and computer-executable instructions that, when executed by the computing system, cause the computing system to create the at least a first instance of the second data artifact.

15. The one or more computer readable storage media of claim 14, further comprising:

computer-executable instructions that, when executed by the computing system, cause the computing system to receive a modelling schema comprising a plurality of modelling artifacts distributed among a plurality of levels of a hierarchy of the modelling schema;

computer-executable instructions that, when executed by the computing system, cause the computing system to determine that a plurality of instances of the first data artifact, the first data artifact corresponding to a first modelling artifact of the plurality of modelling artifacts, are to be created, wherein the creating the first instance of the first data artifact and the creating the second instance of the first data artifact are performed in response to determining that the plurality of instances of the first data artifact are to be created.

16. The one or more computer-readable storage media of claim 15, further comprising:

computer-executable instructions that, when executed by the computing system, cause the computing system to determine that the first level is a highest level of the hierarchical schema; and computer-executable instructions that, when executed by the computing system, cause the computing system to, in response to determining that the first level is the highest level of the data artifact schema; set the second instance of the first data artifact to retrieve first data via data federation.

17. The one or more computer-readable storage media of claim 16, further comprising:

computer-executable instructions that, when executed by the computing system, cause the computing system to set the first instance of the first data artifact to retrieve data from, or be obtainable using, the second data artifact.

18. The one or more computer-readable storage media of claim 15, further comprising:

computer-executable instructions that, when executed by the computing system, cause the computing system to determine that the second level is a lowest level of the hierarchical schema; and computer-executable instructions that, when executed by the computing system, cause the computing system to, in response to determining that the second level is the lowest level of the hierarchical schema; set the second data artifact to retrieve data via data replication.

19. The one or more computer-readable storage media of claim 15, further comprising:

computer-executable instructions that, when executed by the computing system, cause the computing system to set the first instance of the first data artifact to retrieve data from, or obtainable using, the second data artifact.

20. The one or more computer-readable storage media of claim 15, wherein the first data artifact comprises a logical pointer that can be set to point to different data sources.

* * * * *